United States Patent
Neuhard et al.

(10) Patent No.: US 6,335,795 B1
(45) Date of Patent: *Jan. 1, 2002

(54) METHOD FOR CUSTOMIZING PRINT ATTRIBUTE CHOICES BASED ON SELECTED MODEL, MEDIA, AND PRINTER

(75) Inventors: Deborah Elizabeth Neuhard; Robert Curt Nielsen; Dwight Ross Palmer; Luana Vigil, all of Longmont, CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,066

(22) Filed: Sep. 15, 1997

(51) Int. Cl.[7] .............................................. G06F 15/00
(52) U.S. Cl. ..................................... 358/1.15; 358/1.16
(58) Field of Search ................................ 395/101, 114, 395/112, 109, 110; 358/1.14, 1.16, 1.9, 1.1, 1.2, 1.12, 1.15

(56) References Cited

U.S. PATENT DOCUMENTS

| 4,970,554 A | 11/1990 | Rourke ........................ 355/202 |
| 5,450,571 A | 9/1995 | Rosekrans et al. .......... 395/500 |
| 5,467,434 A | 11/1995 | Hower, Jr. et al. ......... 395/114 |
| 5,659,795 A | * 8/1997 | Duvall et al. ................ 395/835 |
| 5,734,915 A | * 3/1998 | Roewer ....................... 395/773 |

OTHER PUBLICATIONS

IBM Print OnDemand Executive Summary and Planning Guide for RPQs 8B3967 and 8B3968 for the IBM 3900 Model DR1/DR2 High Resolution Printing System, Document No. G544–5324–00, dated Jun. 19, 1996.

IBM Print OnDemand User's Guide, Document No. G544–5325–00, Dated Jun. 20, 1996, author Dave Thomson, pp. 25–26, 39–42, and 45–46.

IBM OnDemand for AIX Using the Administrator Interface Version 2, Document No. S544–5279–00, dated May 1996.

* cited by examiner

Primary Examiner—Joseph Mancuso
Assistant Examiner—Douglas Tran
(74) Attorney, Agent, or Firm—David W. Victor; Konrad Raynes & Victor LLP

(57) ABSTRACT

The present invention concerns a method, apparatus, and article of manufacture for selecting one of a plurality of printers attached to a server with a user interface installed on a computer networked to the server. The computer would first query a cache or the server for a first set of print options supported by at least one of the printers. The user interface is then updated to include the first set of print options. After the user interface program is used to select a print option from the first set, the computer then determines a second set of print options available with the previously selected print option. Each print option in the second set is supported by at least one of the printers that also supports the print option selected from the first set. The user interface program is then updated to include the second set of print options. After the user interface program is used to select a print option from the second set, the computer determines all the printers that support the user selected print options. After the user interface program is updated with the printers that support the user selected print options, the user interface can be used to select a printer that can handle the print job and user selected options.

18 Claims, 22 Drawing Sheets

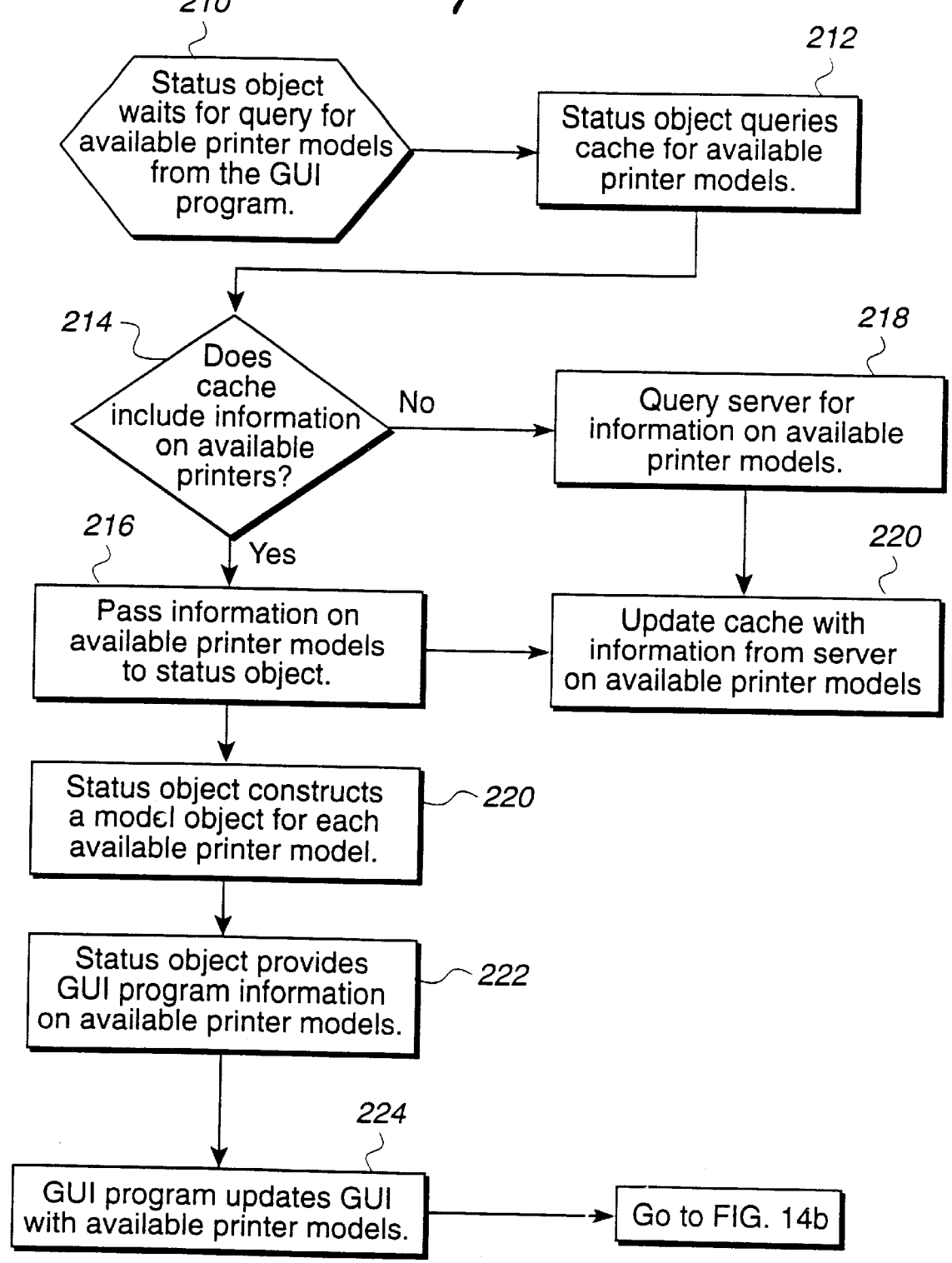

METHOD FOR CUSTOMIZING PRINT ATTRIBUTE CHOICES BASED ON SELECTED MODEL, MEDIA, AND PRINTER

CROSS-REFERENCE TO RELATED APPLICATIONS

This application is related to the following co-pending and commonly-assigned applications:

Application Ser. No. 08/929,609, filed on same date herewith, by Chris Samuel Goertz, Leonard Corning Lahey, Robert Curt Nielsen, Dwight Ross Palmer, and Luana Vigil, entitled "A Method For Creating And Organizing A Job Ticket In A Network Printing System";

Application Ser. No. 08/932,065, filed on same date herewith, by Leonard Corning Lahey, Deborah Elisabeth Neuhard, and Dwight Ross Palmer, entitled "A Method For Organizing Files Associated With A Job Ticket In A Network Printing System";

Application Ser. No. 08/929,997, filed on same date herewith, by Deborah Elisabeth Neuhard, Robert Curt Nielsen, Dwight Ross Palmer, and Luana Vigil, entitled "A Method For Organizing Raster Image Processor Files Associated With a Job Ticket Used in a Network Printing System";

Application Ser. No. 08/931,013, filed on same date herewith, by Leonard Corning Lahey, Dwight Ross Palmer, and John Stuart Walker, entitled "A Method for Organizing Files in a Library in a Network Printing System";

Application Ser. No. 08/829,844, filed on same date herewith, by Leonard Corning Lahey, entitled "Method for Real Time Customization of a Dialog Box for Accessing a Library Within a Network Printing System";

Application Ser. No. 08/929,637, filed on same date herewith, by Kate Goes In Center, Deborah Elisabeth Neuhard, Robert Curt Nielsen, and Dwight Ross Palmer, entitled "A System, Method, and Program for Using Animations to Show Page Layout Combinations in a User Interface for Submitting Print Jobs"; and Application Ser. No. 08/929,627, filed on same date herewith, by Leonard Corning Lahey, Deborah Elisabeth Neuhard, and Dwight Ross Palmer, entitled "A System, Method, and Program for Including Within a User Interface Having File Menu Options an Ability to Make a New File Like a Pre-Existing File Wherein Any Pre-Existing File Can Be a Template for a New File";

all of which applications are incorporated herein by reference.

BACKGROUND OF THE INVENTION

1. Field of the Invention

The present invention relates to a user interface for creating a job ticket in a network printing system and, in particular, to a method, apparatus, and article of manufacture for updating the user interface to include print options available in the network printing system.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, prior art systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user.

In prior art network printing systems, the print attribute options available to the user through the GUI are often unavailable in the network printing system. Further, in network printing systems, the available printers and print attributes often change. If the user selects print attributes that are not available in the network printing system, then the print job will abort. However, a significant amount of time may pass before the system recognizes that the user selected printing attributes that are unavailable. Thus, there is a need in the art for network printing systems that eliminate these problems and facilitate the printing of documents in the network printing system.

SUMMARY OF THE INVENTION

To address the requirements described above, the present invention discloses a method, apparatus, and article of manufacture for selecting one of a plurality of printers attached to a server with a user interface program to print a print job. The user interface program is installed on a computer in communication with the server. First, the computer determines a first set of one or more print options, wherein each print option in the first set is supported by at least one of the printers. The user interface is then updated to include the first set of print options. After the user interface program is used to select a print option from the first set, the computer determines a second set of one or more print options available with the print option selected from the first set. Each print option in the second set is supported by at least one of the printers that also supports the print option selected from the first set. The user interface program is then updated to include the second set of print options. After the user interface program is used to select a print option from the second set, the computer determines all the printers that support the user selected print options. The user interface program is then updated with the printers that support the user selected print options. The user interface can then be used to select one of the printers that support the user selected print options to print the print job.

In preferred embodiments, the first set of print options comprises one or more types of printers attached to the server and the second set of print options comprises one or more media types available for the selected type of printer.

In still further embodiments, the computer includes a cache. The cache is updated by querying the server for the first set of print options, a second set of print options available for each print option in the first set, and the printers that support the first and second sets of print options and updating the cache with the queried information. This information is obtained by querying the server. When determining with the computer the first set of print options, the second set of print options, and the printers that support the user selected print options, the cache is first queried. If the cache does not include this information, then the server is queried.

It is an object of the present invention to minimize time spent querying for print options available in the network printing system.

It is a further object to minimize queries by only querying for print options when needed.

It is another object of the present invention to provide a cache including print option information which can be queried before a server is queried. Providing the cache for initial queries reduces querying time because it takes longer to query the server than the cache.

It is yet a further object to provide the user with print options supported by the network printing system in order to insure that a printer is available in the network printing system that can process the user selected print options.

BRIEF DESCRIPTION OF THE DRAWINGS

Referring now to the drawings in which like reference numbers represent corresponding parts throughout:

FIGS. 14a, 14b, and 14c are flowcharts that illustrates the general logic of a routine for querying the network printing system for available print options in accordance with the present invention.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
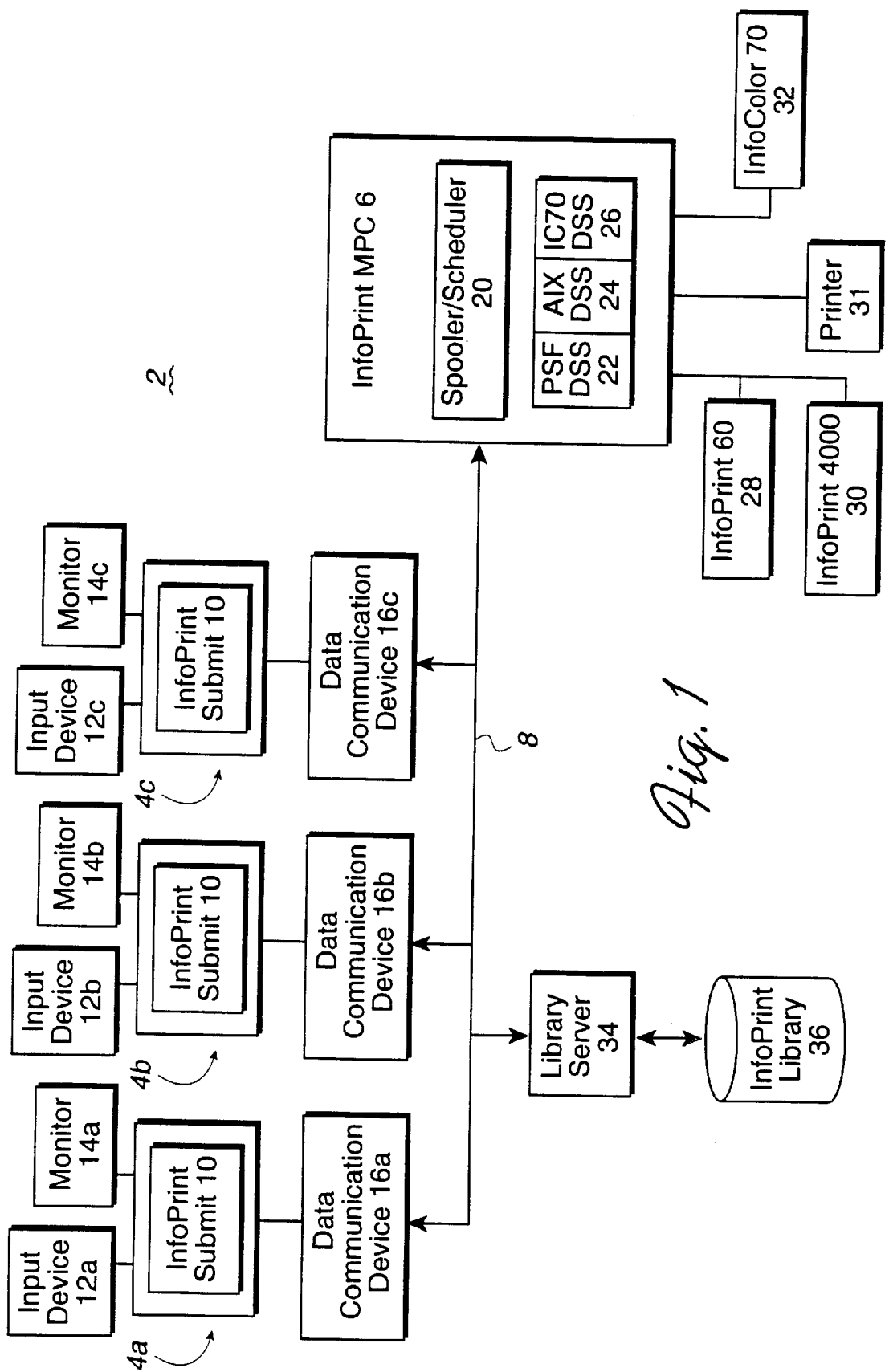
FIG. 1 is a block diagram illustrating an exemplary hardware environment for a network printing system in accordance with the present invention.

FIG. 1 shows a preferred embodiment of a network printing system 2 adapted to incorporate the present invention. The network printing system 2 comprises a plurality of client computers 4a, b, c that are connected to an InfoPrint Multiple Printer Controller (MPC) server 6 via a network 8 (e.g., Token-ring, LAN, Ethernet, WAN, TCP/IP, etc.).

In the preferred embodiment, the client computers 4a, b, c comprise personal computers that execute under the control of an operating system, such as the WINDOWS operating system. However, those skilled in the art will recognize that the client computers 4a, b, c could comprise any type of computer such as a workstation, mainframe, etc., and the operating system could comprise any operating system, such as OS/2, OS/390, MVS, VM, AIX, MACINTOSH, UNIX, etc. Installed on each client computer 4a, b, c is InfoPrint Submit software 10. The InfoPrint Submit software 10 configures the client computers 4a, b, c to allow the user to create and submit a job ticket in accordance with the present invention. Attached to each client computer 4a, b, c is an input device 12a, b, c (e.g., keyboard, mouse pointing device, voice activated input device, touch sensitive display, etc.), monitor 14a, b, c (e.g., CRT, LCD displays, etc.), as well as a data communication device 16a, b, c (e.g. modems, network interfaces, etc.) to interface with the network 8.

In the preferred embodiment, the InfoPrint MPC server 6 is an RS/6000 workstation that executes under the control of an AIX operating system. However, those skilled in the art will recognize that the InfoPrint MPC server 6 could be comprised of any type of computer such as a personal computer, workstation, server, minicomputer, mainframe, etc., and the operating system could comprise any operating system, such as OS/390, MVS, VM, OS/2, WINDOWS, MACINTOSH, UNIX, etc. Installed in the InfoPrint MPC server 6 is a spooler/scheduler 20, a Print Services Facility (PSF) device specific subsystem (DSS) 22, an AIX DSS 24, and an IC70 DSS 26.

The spooler/scheduler 20 is comprised of the InfoPrint executable code and includes a suite of applications. The spooler/scheduler 20 receives print jobs from the client computers 4a, b, c and generates printer files that are transmitted to a printer 28, 30, 31 or 32 that can appropriately handle the print job. In this way, the user may elect to not specify a printer in the network printing system 2 and let the spooler/scheduler 20 select an appropriate printer 28, 30, 31 or 32.

After processing the print job and selecting a destination printer 28, 30, 31 or 32 for the job, the spooler/scheduler 20 sends the print job to one of the device specific subsystems PSF DSS 22, AIX DSS 24, and IC70 DSS 26. The DSS programs 22, 24, and 26 are device drivers for driving printers 28, 30, 31, 32 attached to the InfoPrint MPC server 6, wherein the PSF DSS 22 drives printers 28 and 30, the AIX DSS 24 drives printer 31, and the IC70 DSS 26 drives printer 32. In the preferred embodiment shown in FIG. 1, the printers attached to the InfoPrint MPC server 6 include an InfoPrint/60 printer 28, an InfoPrint/4000 printer 30, and an InfoColor/70 printer 32.

Also connected to the network printing system 2 is a library server 34 storing an InfoPrint library 36 of files and job tickets. In preferred embodiments, the library server 34 is a RISC System/6000 that executes under the AIX operating system and includes the IBM DB2/6000 database software which provides database management services for the library 36. However, those skilled in the art will recognize that the library server 34 could comprise a personal computer, workstation, mainframe etc. and the operating system could comprise OS/2, WINDOWS, UNIX, O/S390, MVS, VM, etc., and that alternative database programs could be used in lieu of IBM's DB2/6000. In alternative embodiments, the InfoPrint MPC server 6 may be the hardware platform for the library server 34. The InfoPrint library 36 is a complete document storage system that archives printing files, application source data, fonts, images, TIFF data, etc. The client computers 4a, b, c may directly access, store, view and retrieve files and job tickets from the InfoPrint library 36. The hardware and software arrangement of the library server 34 and InfoPrint library 36 is further described in the patent applications entitled "A Method for Organizing Files in a Library in a Network Printing System," and "Method for Real Time Customization of a Dialog Box for Accessing a Library Within a Network Printing System," both of which were incorporated by reference above.

It should be appreciated that, in alternative embodiments, the network printing system 2 may be comprised of components and products other than those discussed above. Moreover, the network printing system 2 can be implemented on different operating systems and hardware. For instance, hardware and software from manufacturers other than IBM may be used to perform the functions of the InfoPrint MPC server 6, the spooler/scheduler 20 and DSS drivers 22, 24, and 26, the library server 34, and the InfoPrint library 36. Printers having printing capabilities different from the disclosed printers 28, 30, and 32 may be used. Further, in alternative embodiments, any number of client computers 4a, b, c having alternative user interfaces may be used. Still further, the client computers 4a, b, c may connect to the InfoPrint MPC server 6 via multiple networks and remote lines. Those skilled in the art will recognize that other alternative hardware and software environments may be used without departing from the scope of the present invention. As such, the exemplary environment in FIG. 1 is not intended to limit the present invention.

Job Ticket

The present invention includes the data structure of an electronically-stored job ticket and the computer-implemented method, apparatus, and article of manufacture used to create the job ticket. The job ticket of the present invention maintains information on print attributes and the location of the print files which comprise the print job.

Figure 2:
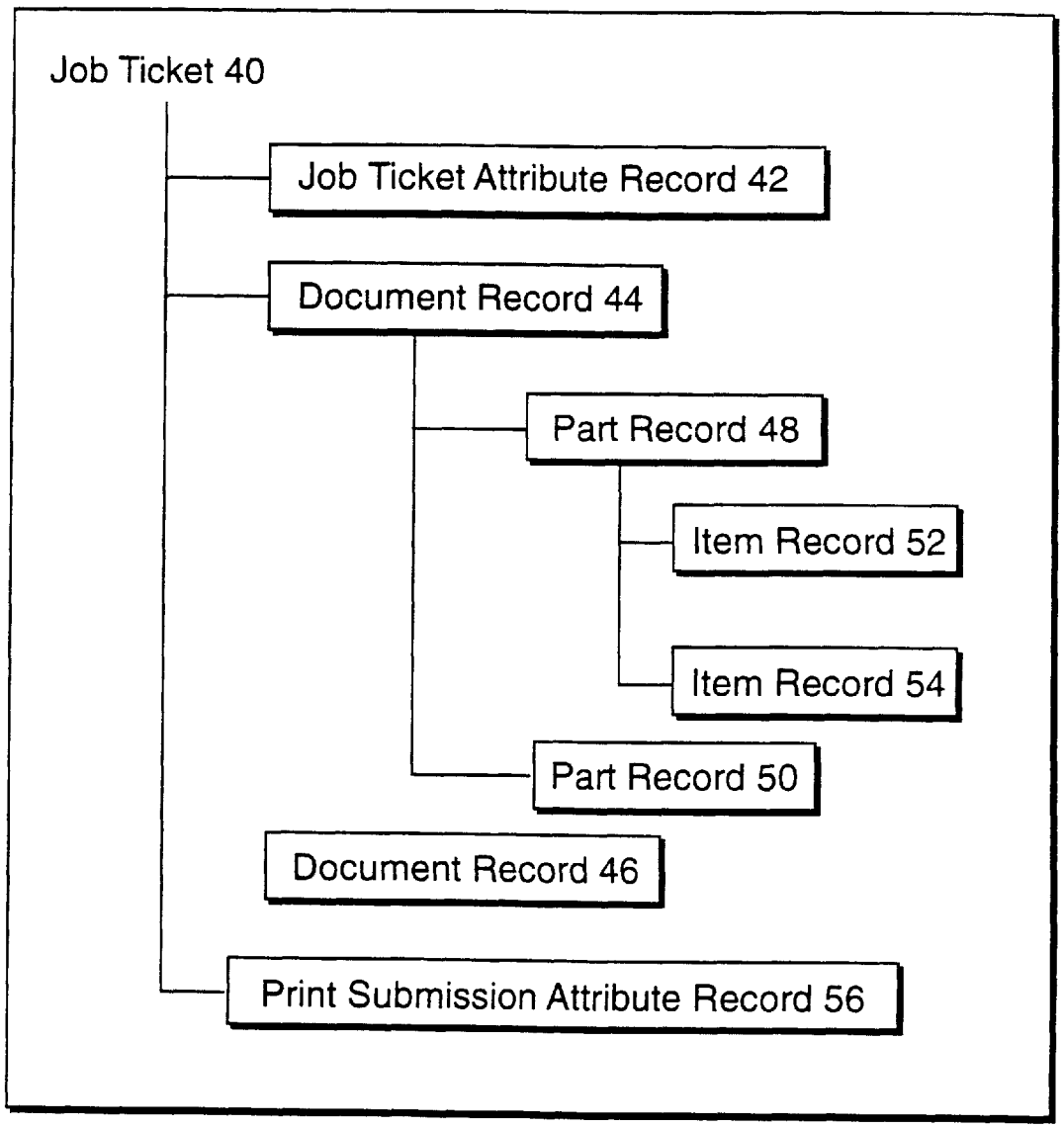
FIG. 2 is a block diagram illustrating a preferred embodiment of a job ticket data structure in accordance with the present invention.

FIG. 2 shows a preferred embodiment of the hierarchical tree structure arrangement of data within a job ticket 40 as stored in a data structure in a memory or as stored as a file in a data storage device. The first record in the job ticket 40 is a job ticket attribute record 42, which includes identification information, such as the file name containing the job ticket 40, a job ID, the customer name, etc.

Within each job ticket 40 are also one or more document records, wherein FIG. 2 shows two document records 44 and 46. The document records 44, 46 include all the information the InfoPrint MPC server 6 needs to print a document included in the print job.

Each document record 44, 46 is associated with one or more part records. Document record 44 is associated with two part records 48 and 50. A part is the smallest component submitted to the printer for printing. For instance, if the document is comprised of a black and white text body with a color cover, one part 48 would be the black and white text and another part 50 would be the color cover.

Each part record 48, 50 is a grouping of one or more item records. Part record 48 is a grouping of two item records 52 and 54. An item record includes information on a component of the print job. In preferred embodiments, item records 52, 54 may include information on the following item types: a file item; a hardcopy item; a library file item; variable data; and an inventory item.

A file item is a print image file, such as a TIFF, PostScript, RIP, PDF or PCL file. Included in the item records 52, 54 is information on the location of the item, e.g., the location of the print image file within the network printing system 2 and the location of the source file from which the print image file item was generated. The user may want to know the location of the source file to modify the contents of the print image. The location information included in the item records 52, 54 is used to access the print image files for printing.

A hardcopy item is a list of scanned TIFF files.

A library file item is a file archived in the library 36. The library file item may include information on the location of the library file within the library 36.

Variable data includes files used to create customized print settings to add to the print job, e.g., adding the name and address of the customer to the printed document.

The inventory item includes information on an item to be packaged with the document 44, 46 which is not printed, such as a diskette, CD-ROM, etc.

Thus, an "item" includes print image files comprised of data representing graphical images that are associated with the file item, hardcopy item, library file item or variable data item. The item records 52, 54 also include information on files associated with the print image files for the item. Such associated files may include a source file from which the file item was generated, a Raster Image Processor format of the file item, and a viewable version of the format item. For instance, if the file item is a PostScript file, then the viewable version would be in the PDF file format. Other file types may also be associated with the items.

In the present invention, the job ticket 40 stores print attribute information, such as information on the layout of the printed page, the printer selected, the alignment of the page, and the look of the page, for each element included in the job ticket 40. As used herein, the term "element" means any of the document records 44, 46, part records 48, 50, and item records 52, 54 included in the job ticket 40. Any print attribute information set for an element at a higher hierarchical level in the tree applies to the elements at the lower hierarchical levels which branch from that higher element. For instance, print attribute information set at the document record 44 level automatically applies to the part records 48, 50 and the item records 52, 54 which branch from the document record 44. Print attribute information set at the part record 52 level likewise applies to the items 52, 54 branching therefrom. In this way, the lower level elements inherit the print attributes of the higher level elements from which they branch.

The print submission attribute record 56 includes information on the print job, such as scheduling options, priority, difficulty, etc. The information in the print submission attribute record 56 does not affect what is printed, but instead concerns the work flow of the print job.

In preferred embodiments, print attribute information is stored as key/value pairs. The key is the mode or name of the attribute and the value is the value for the operation. For instance, to indicate a selection of a media type for a print job, the print attribute information would be stored as Input Bin/Tray 1. The key is the input bin containing the selected media, and the user selected value is the first tray. This key/value method for representing print attribute information is readily extendible. To add additional values for specific print attribute types, the new value would be described with reference to its key. Thus, when the InfoPrint Submit software 10 and print driver programs 22, 24, 26 are processing the print attribute information, they immediately recognize the operation the value represents.

InfoPrint Submit Software

The job ticket 40 may be created on the client computer 4a, b, c using the InfoPrint Submit software 10 installed thereon. The InfoPrint Submit software 10 includes a graphical user interface (GUI) displayed on the monitor 14a, b, c that the user may use to create the job ticket 40. The InfoPrint Submit software 10 then translates the job ticket 40 created thereby to a format compatible with the InfoPrint MPC server 6.

The client computer 4a, b, c transmits this translated job ticket 40 along with the items identified in the item records 52, 54 to the InfoPrint MPC server 6 over the network 8. The InfoPrint MPC server 6 uses the information in the translated job ticket 40 to process the transmitted items 52, 54 and generate printer files based thereon. The InfoPrint MPC server 6 then selects an appropriate printer 28, 30, 31 or 32, to print the print job and transmits the printer files to the selected printer 28, 30, 31 or 32 for printing.

When printing copies of the items or a part including a group of items, the InfoPrint MPC server 6 prints a cover sheet on top of each set of copies including the information in the job ticket attribute record 42 to identify the set of copies. The user can then gather the copies generated at different printers throughout the network printing system 2 and assemble the final document using the information on the cover sheet for guidance.

In this way, the present job ticket invention maintains information on all the documents included in a customer order and all information needed by the InfoPrint MPC server 6 to print the different documents within a customer order.

Graphical User Interface

FIGS. 3, 4a, 4b, 4c, 5a, 5b, 6a, 6b, 6c, 7a, 7b, 8, 9, and 10 are illustrations of the graphical user interface (GUI) 60 provided by the InfoPrint Submit software 10. The user creates the job ticket 40 by entering information into different fields and selecting specific options presented in the GUI 60. Standard user interface mechanisms are preferably implemented in the GUI 60 to provide the user with the necessary functionality and ease of use.

Figure 3:
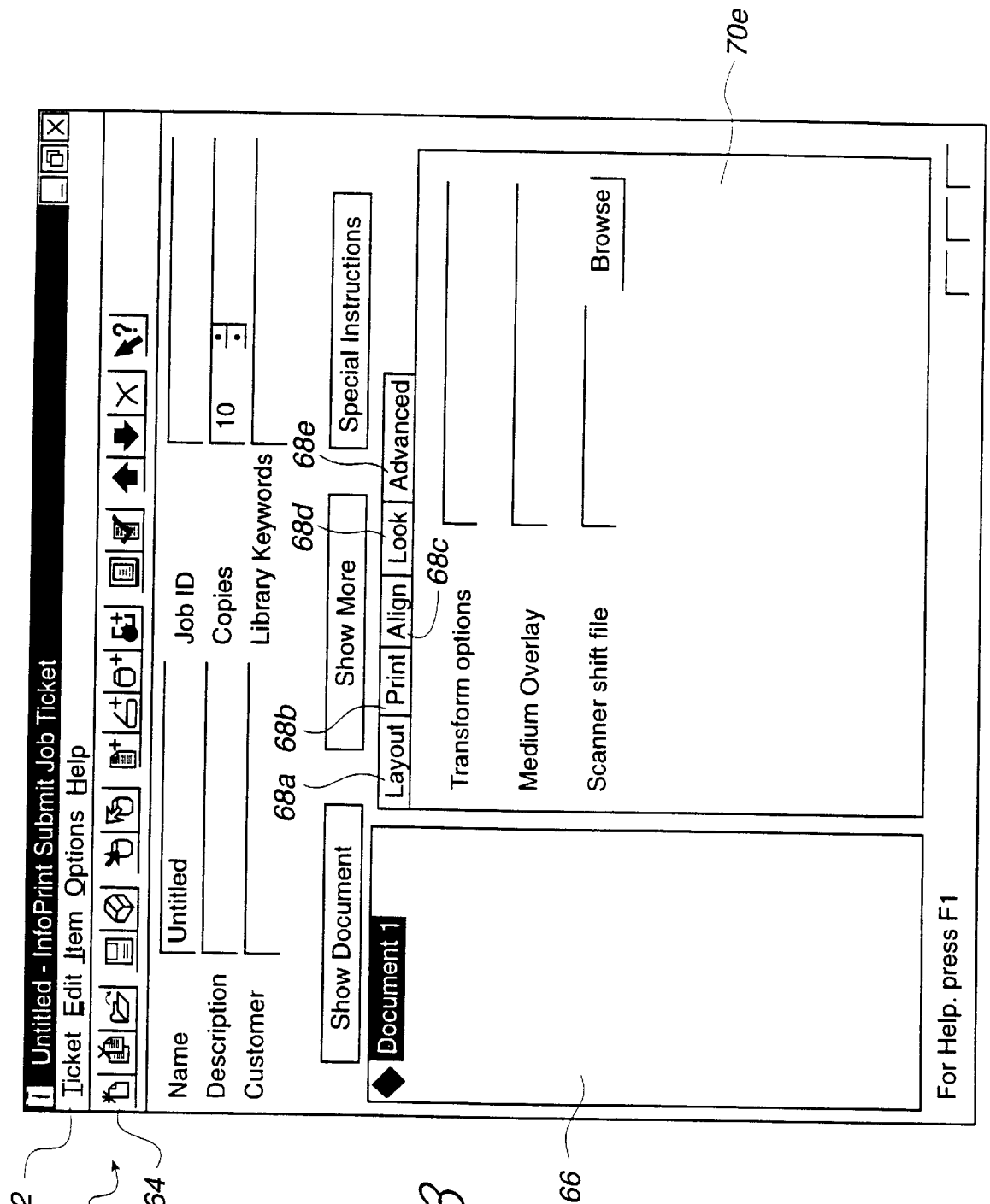
FIGS. 3, 4a, 4b, 4c, 5a, 5b, 6a, 6b, 6c, 7a, 7b, 8, 9, and 10 illustrate a preferred embodiment of a graphical user interface (GUI) displayed on a monitor in accordance with the present invention.

FIG. 3 shows the GUI 60 presented to the user upon selecting the job ticket option via an icon or command. At the upper portion of the GUI 60 is a main menu item bar 62 that includes main menu items Ticket, Edit, Item, Options, and Help. Selecting one of the main menu items with a mouse or keyboard command, invokes a further submenu of functions available to the user. Table 1 shows the submenus for each main menu item and functions included therein. Table 2 shows all the functions associated with each main menu item and provides a description of the behavior of each of the functions. Below the main menu item bar 62 is a tool bar 64 comprised of icons that represent certain functions. Below the tool bar 64 is an area presenting six fields labeled Name, Description, Customer, Job ID, Copies, and Library. These six fields comprise the information in the job ticket attribute record 42. The user places the cursor in one of the fields with the mouse and then enters the identification information.

The GUI 60 further includes a tree section 66 for displaying the elements (document records 44, 46 and item records 52, 54) associated with the job ticket 40. FIG. 3 shows only a single document element, Document 1. Associated with each element in the tree section 66 are print attribute page tabs 68a, b, c, d, e, which in the preferred embodiment are radio buttons displayed on the GUI 60. The user can cause the display of a Layout, Print, Align, Look, and Advanced print attribute page 70a, b, c, d, or e by selecting one of the corresponding print attribute page tabs 68a, b, c, d, e. FIG. 3 illustrates the Advanced print attribute page 70e, which includes fields in which the user may specify a transform option to override any conflicting attributes and to build a new document object.

Figure 4A:
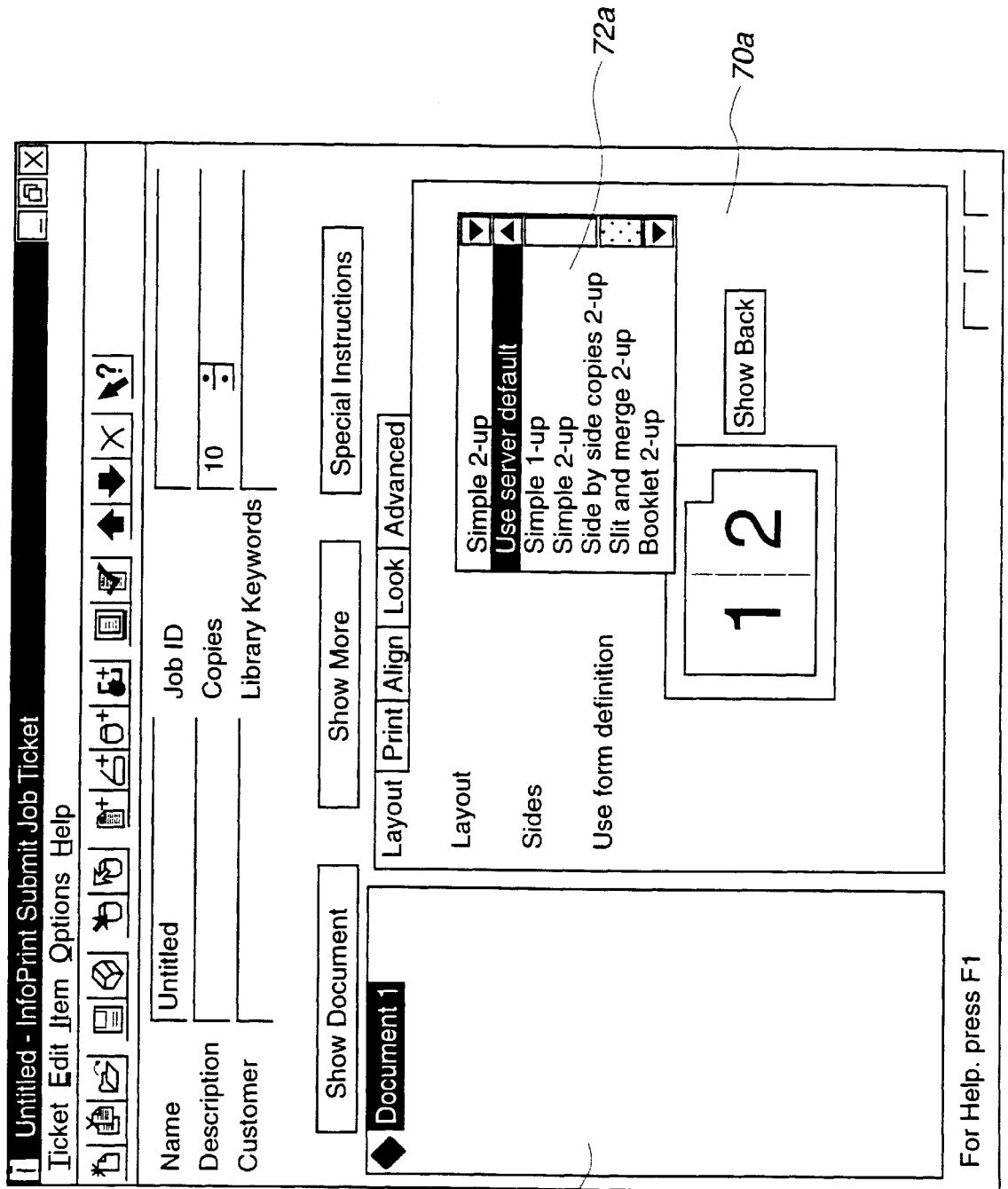
Figure 4B:
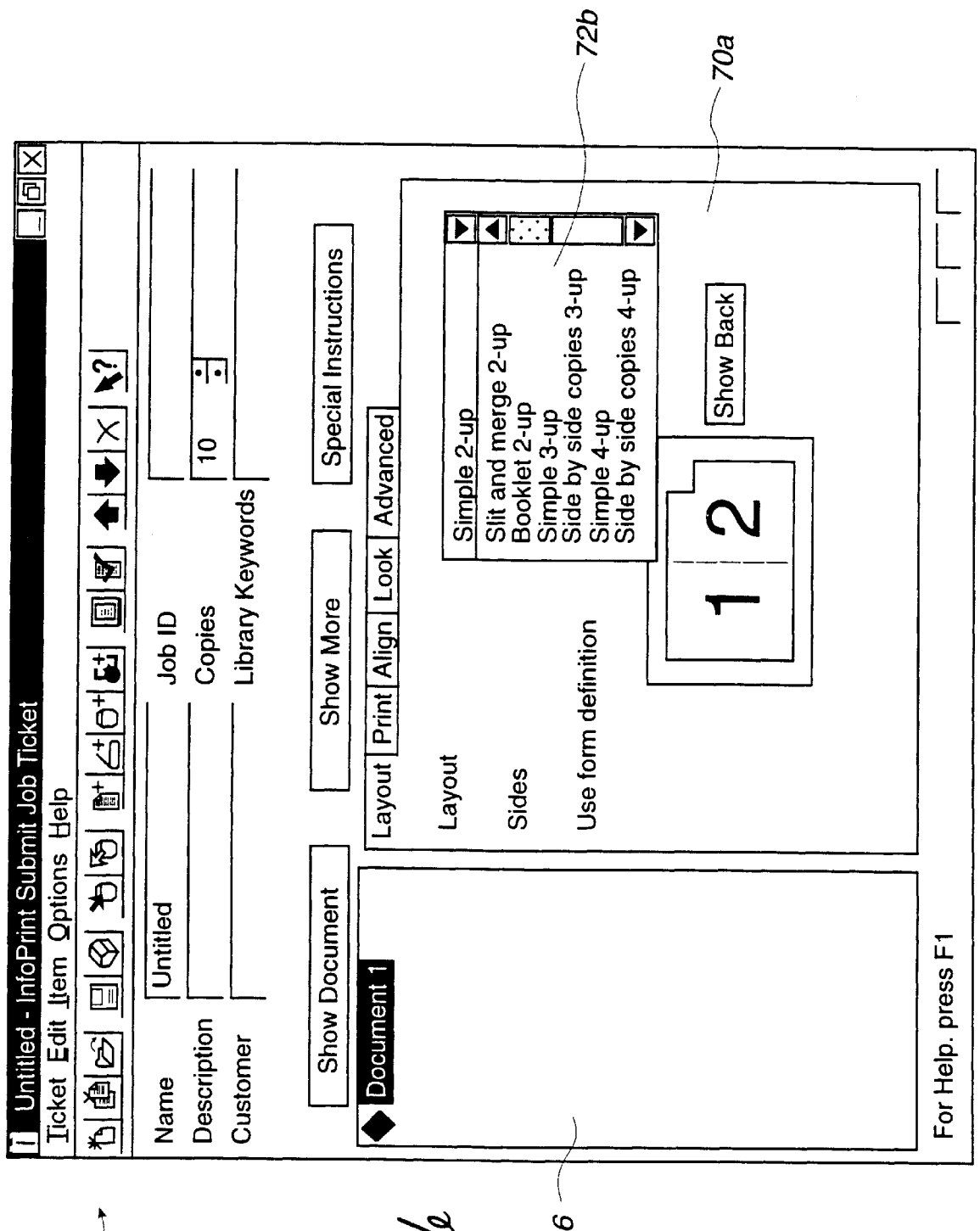
Figure 4C:
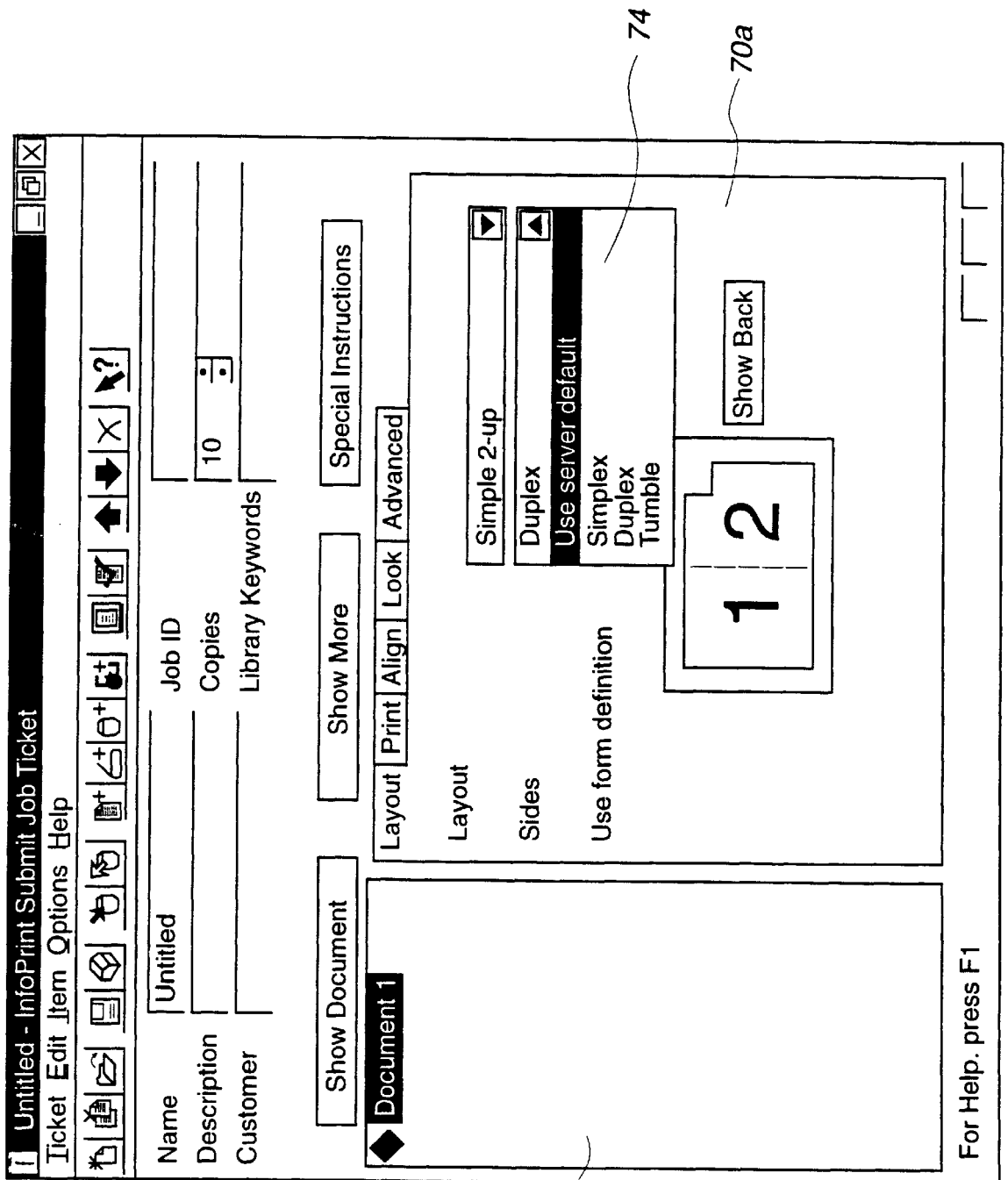

FIGS. 4a, 4b, 4c, 5a, 5b, 6a, 7b, 7c, 8a, and 8b show the print attribute pages 70a, b, c, d associated with Document 1 in the tree section 66. Table 3 provides the print attribute pages 70a, b, c, d, e available for each type of element. FIGS. 4a, 4b, and 4c illustrate a preferred embodiment of the Layout attribute page 70a, in which the user may specify the layout of the printed pages. FIGS. 4a, b show drop down menus 72a, b, respectively, of layout options, e.g., whether the pages are printed side by side, booklet style, etc. FIG. 4c shows a drop down menu 74 of side options, e.g., to print on two sides, one side, etc. Table 4 provides a description of the values in the Layout attribute page 70a and the behavior of the Layout attributes.

Figure 5A:
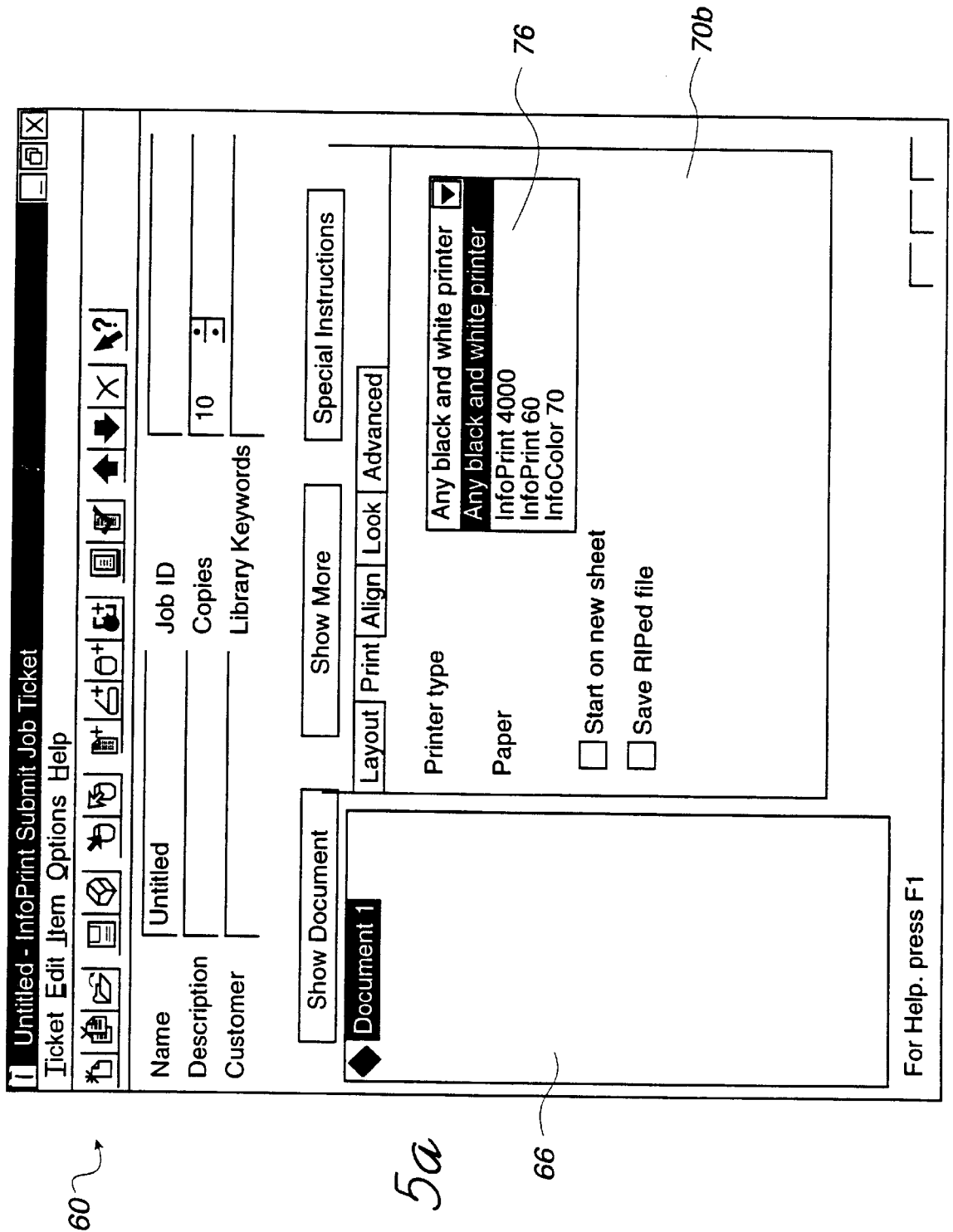
Figure 5B:
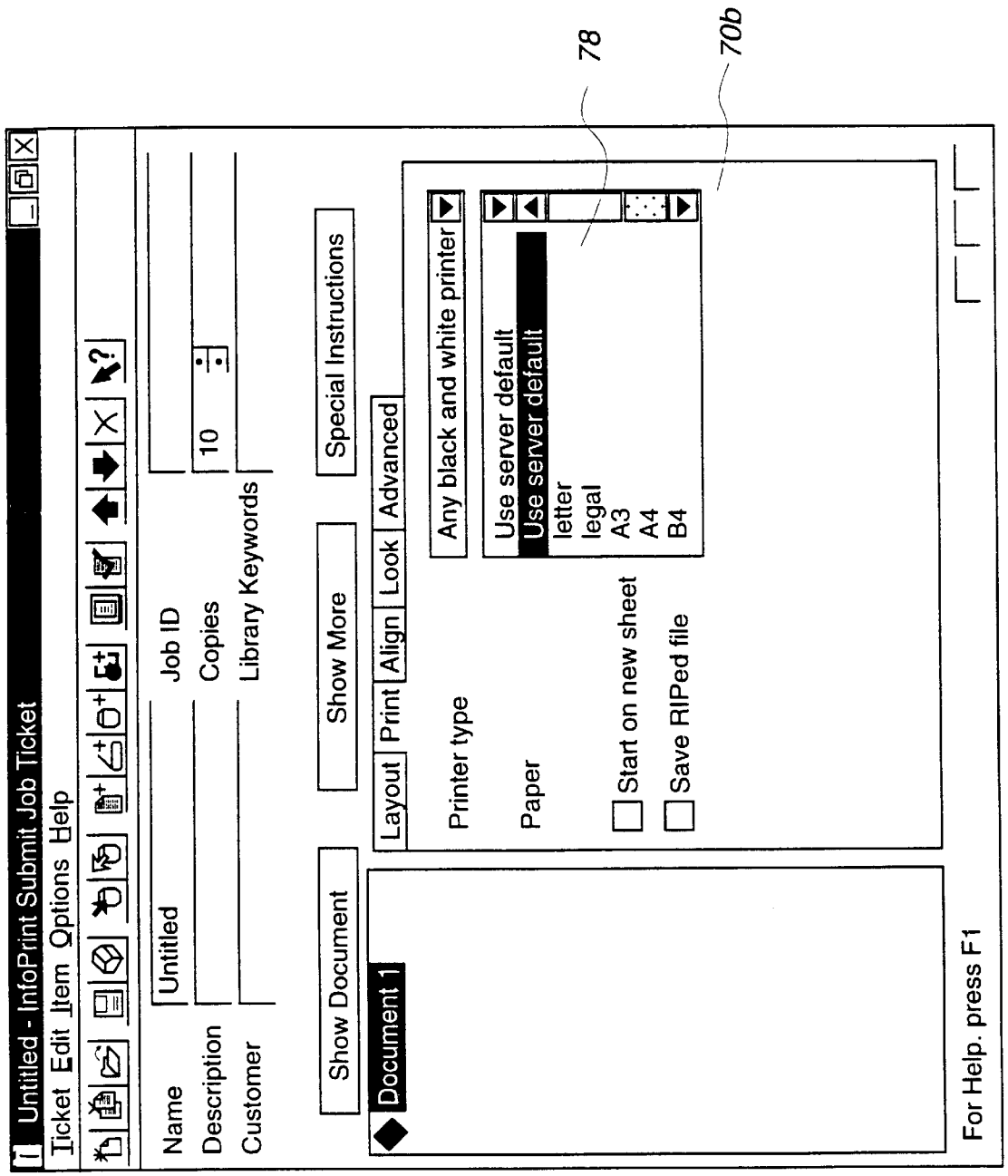

FIGS. 5a, b illustrate a preferred embodiment of the Print attribute page 70b. FIG. 5a shows a drop down menu for a Printer type 76 field in which the user can specify any printer or a specific printer 28, 30, 31 or 32 to print the Document 1. If the user selects a specific printer 28, 30, 31 or 32, then the InfoPrint Submit software 10 modifies the range of print attribute values available in pages 70a, b, c, d, e to include only those print attribute values supported by the selected printer 28, 30, 31 or 32. FIG. 5b shows a drop down menu for a Paper type 78 field in which the user may select a paper type. Table 5 provides a description of the attributes in a preferred embodiment of the Print attribute page 70b and the behavior of the attributes.

Figure 6A:
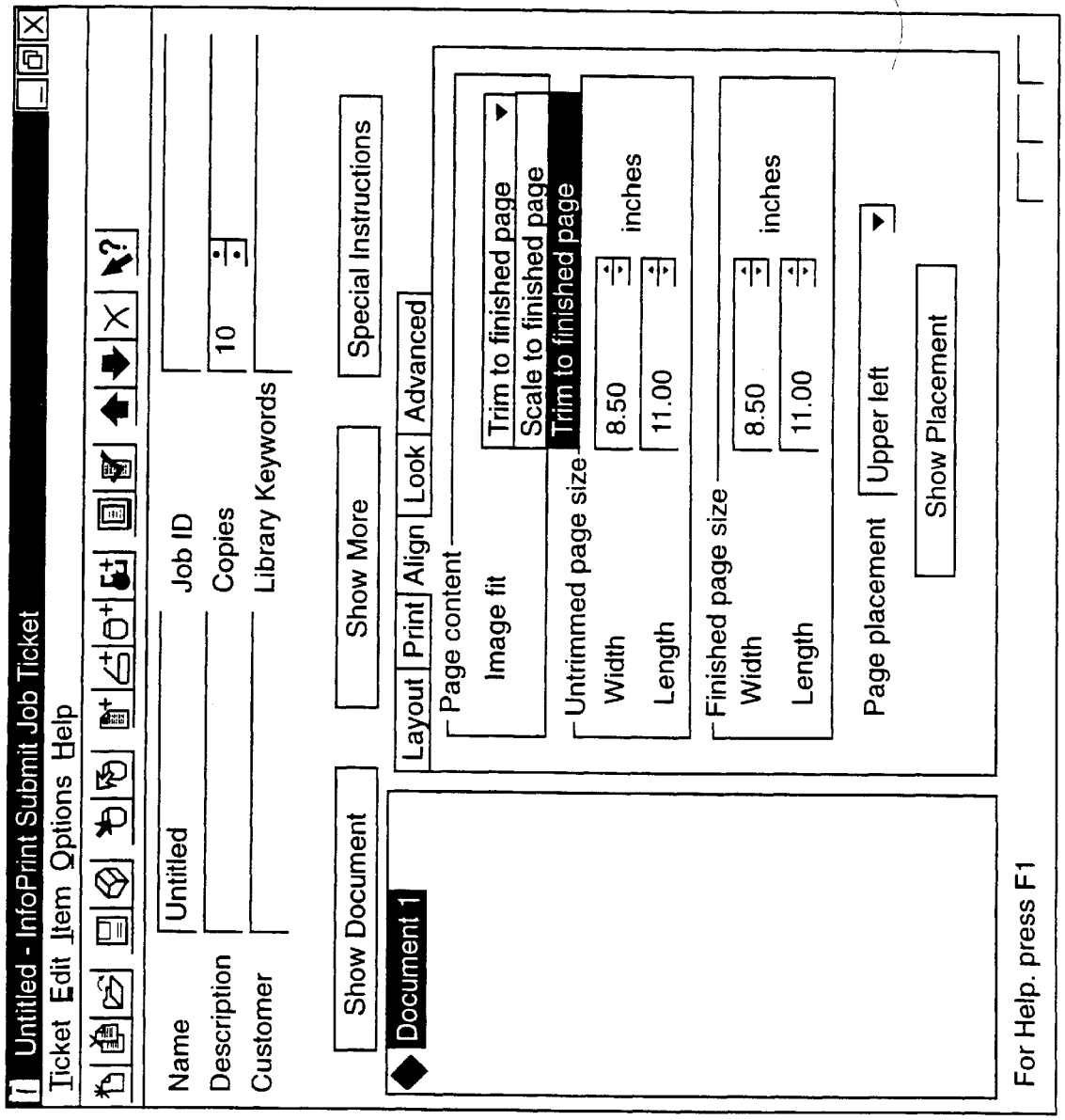
Figure 6B:
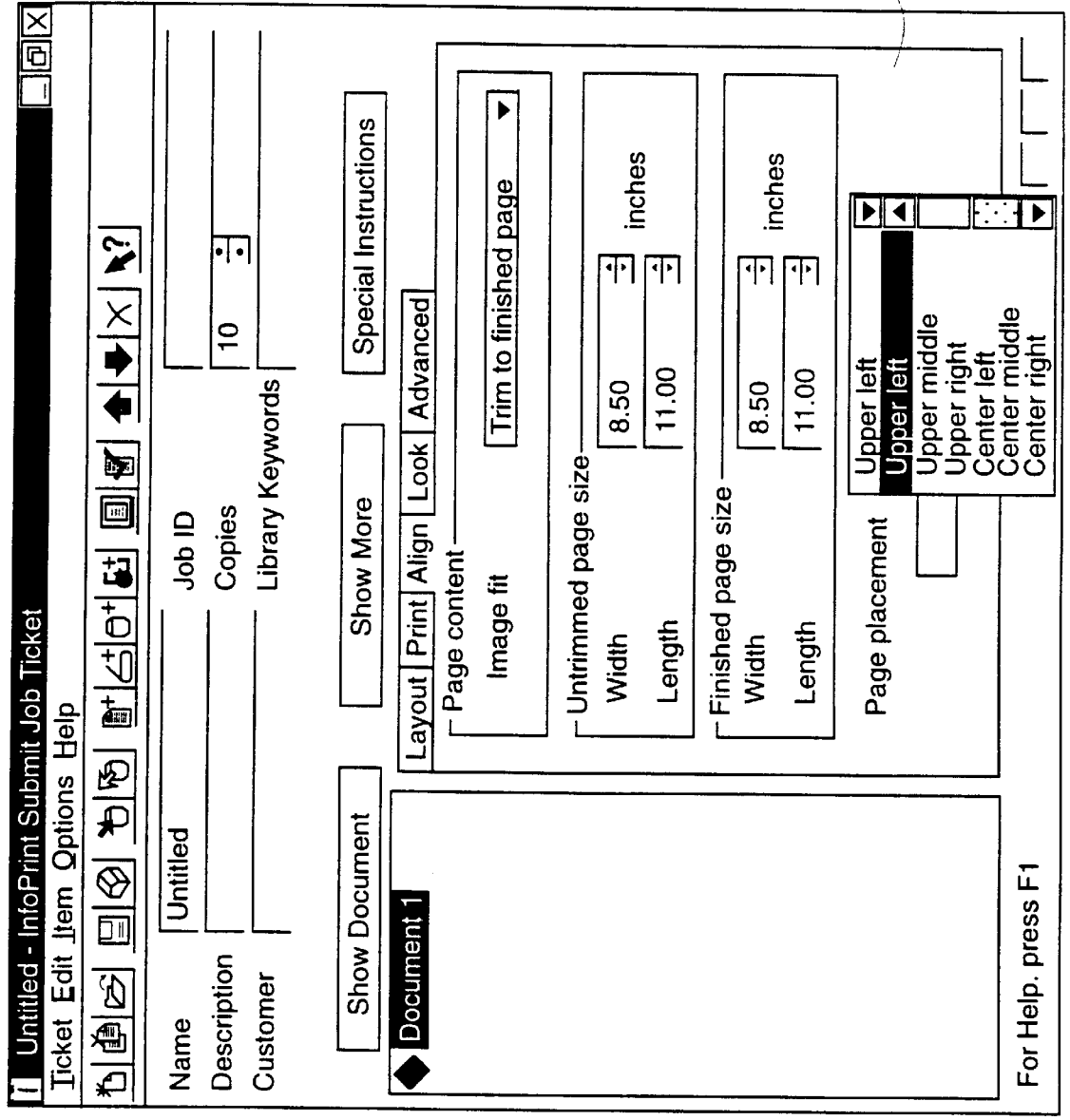
Figure 6C:
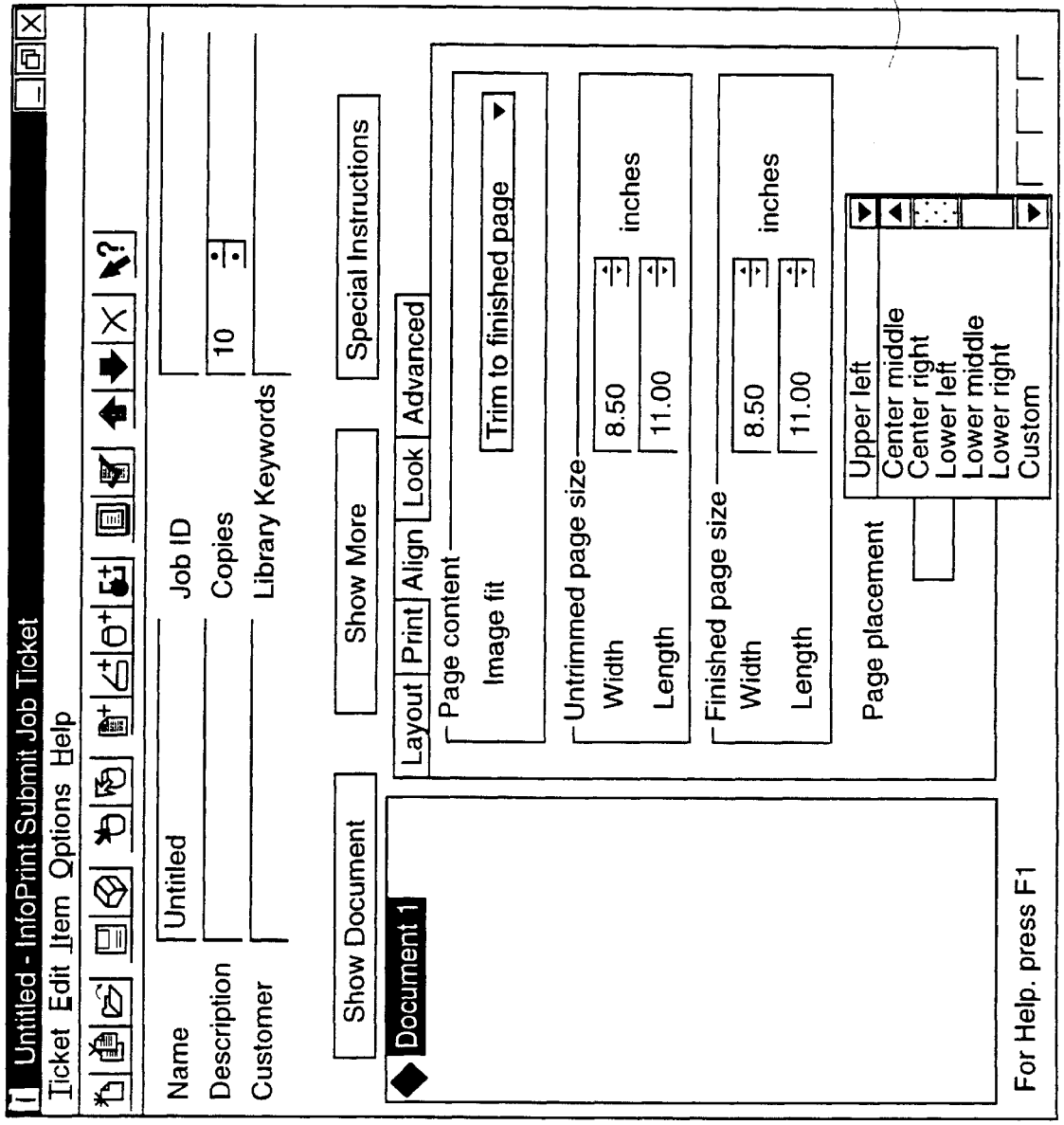

FIGS. 6a, 6b, and 6c illustrate the Align attribute page 70c, which allows the user to specify the orientation and placement of the of the page. Table 6 provides a description of the attributes in a preferred embodiment of the Align attribute page 70c and the behavior of the Align attributes.

Figure 7A:
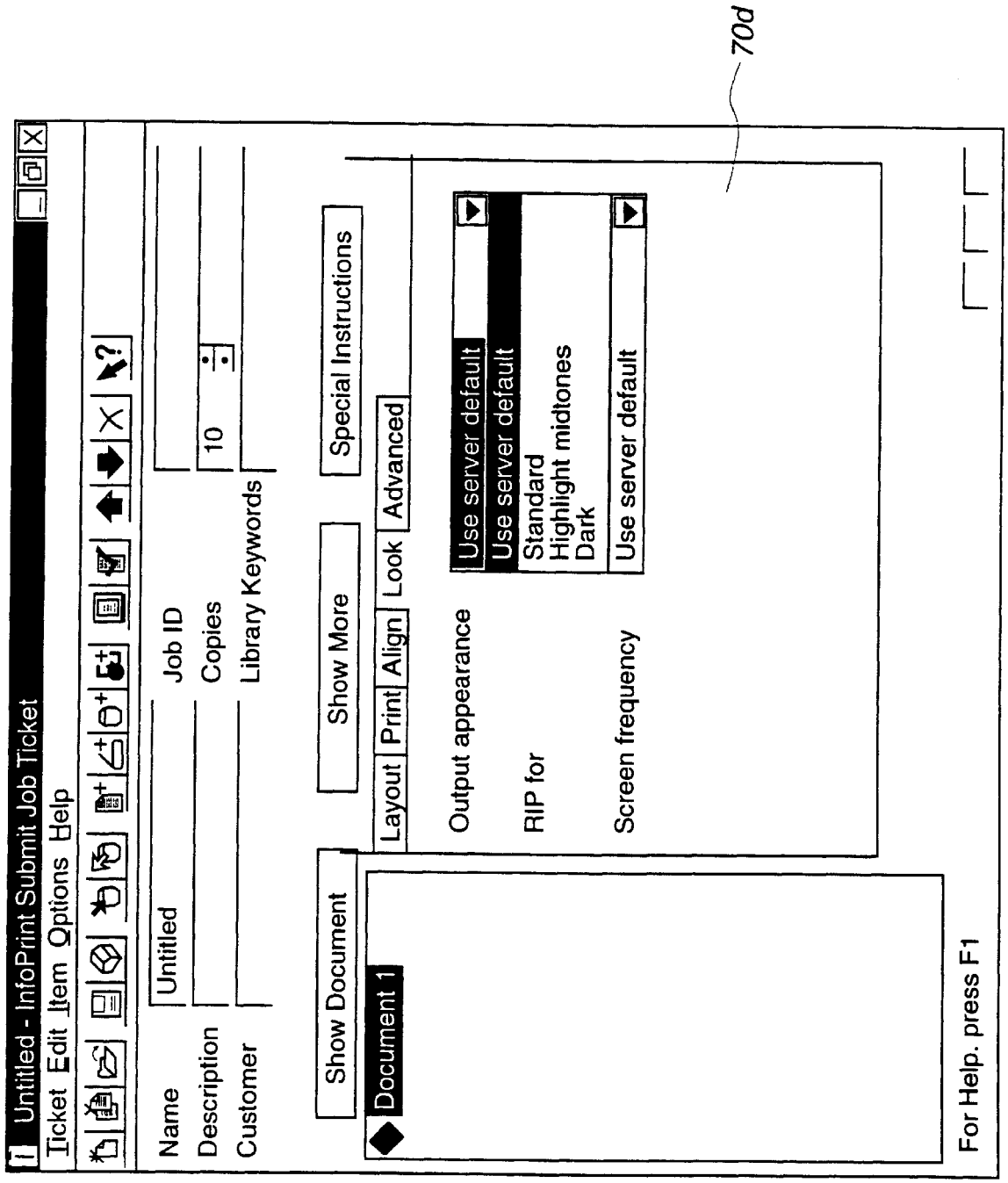
Figure 7B:
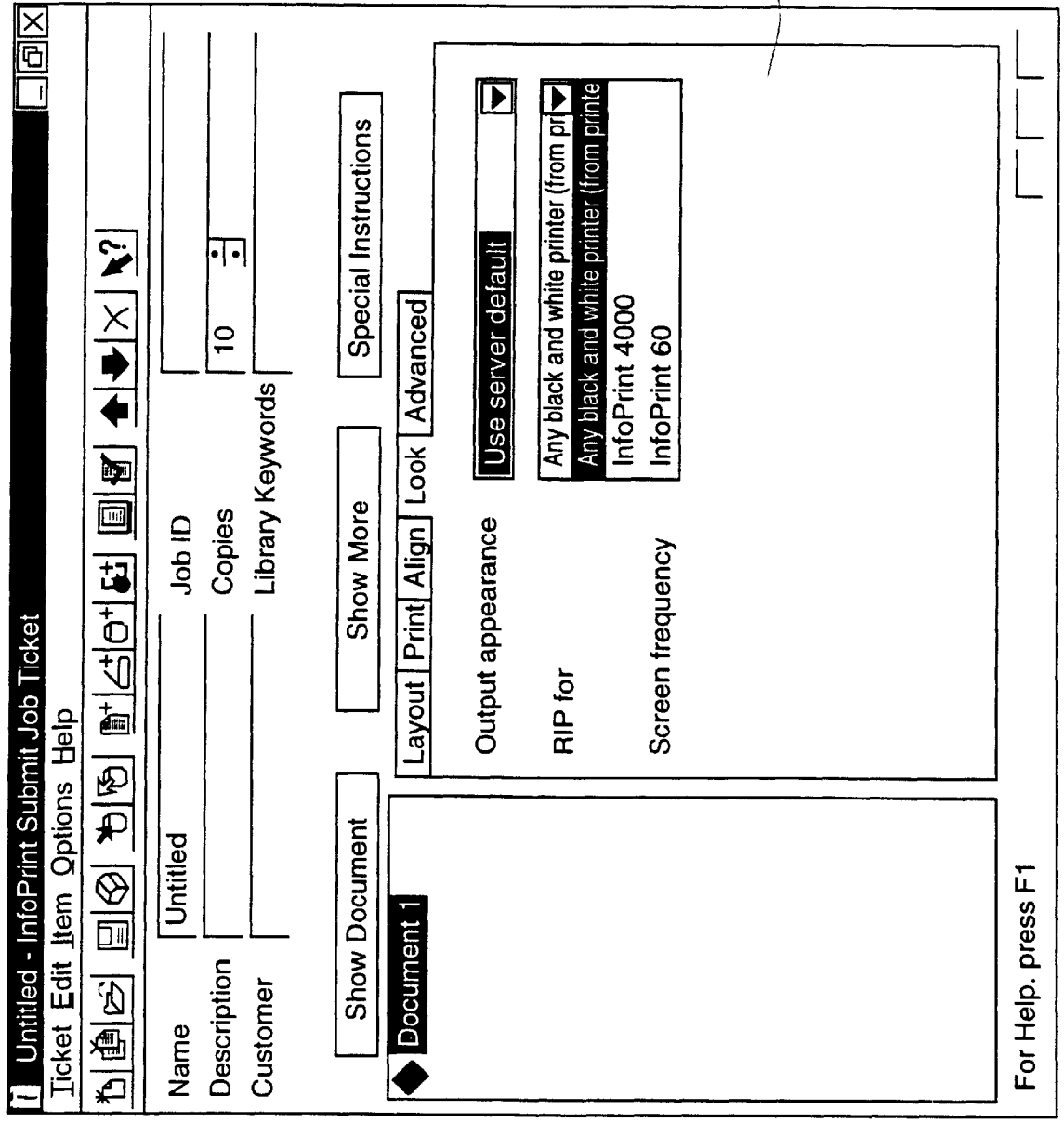

FIGS. 7a and 7b illustrate the Look attribute page 70d and accompanying drop down menus. The Look attribute page 70d includes fields in which the user can set the look of the printed output, e.g., standard, dark, etc., and identify the printer that will receive rasterized data. Table 7 provides a description of the attributes in a preferred embodiment of the Look attribute page 70d and the behavior of the Look attributes.

Figure 8:
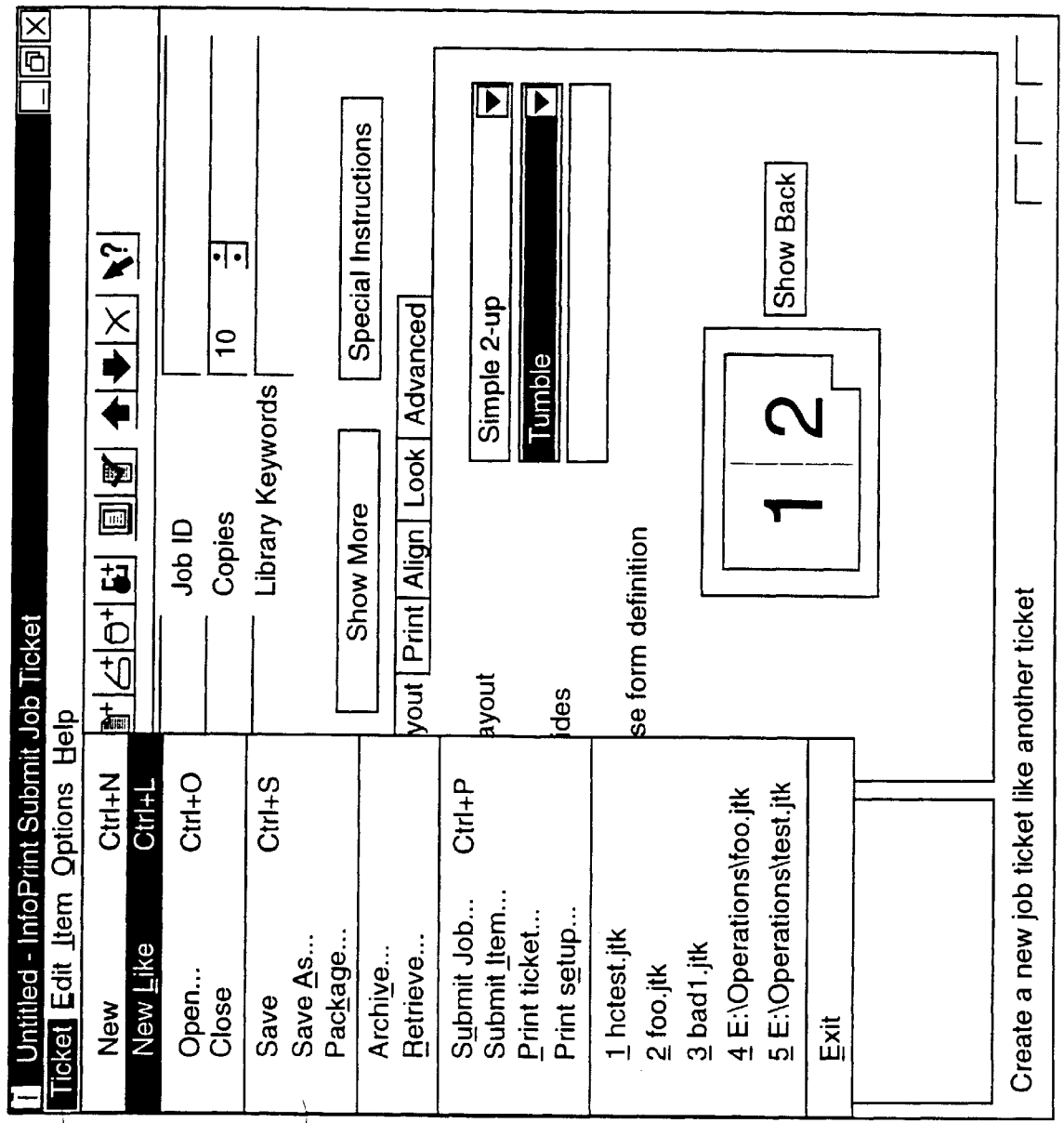

FIG. 8 shows a submenu 80 displayed when the user selects the Ticket item from the main menu item bar 62. The functions included in the submenus of the main menu items may be represented as an icon or alphanumeric string displayed in the GUI 60. The submenu 80 represents the functions as alphanumeric strings describing the function. The Ticket submenu 80 includes functions which allow the user to open a previously created job ticket (Open), create a new job ticket (New), save a job ticket the user has modified (Save or Save as), print the opened job ticket 40 (Print Ticket) or submit the job ticket to the InfoPrint MPC server 6 for printing (Submit Job). The Ticket submenu 80 further includes the Submit function which allows the user to enter the information for the print submission attribute record 56. The Submit function allows the user to select a File and Schedule pages into which the user may enter scheduling priority setting information for the job ticket 40. Tables 8 and 9 provide a description of a preferred embodiment of the fields and behavior of such fields in the File and Schedule pages.

Once the user creates a job ticket, the user may save the job ticket 40 or submit the job ticket 40 to the printing services manager 6 using the Save and Submit Job functions displayed in the Ticket submenu 80.

Figure 9:
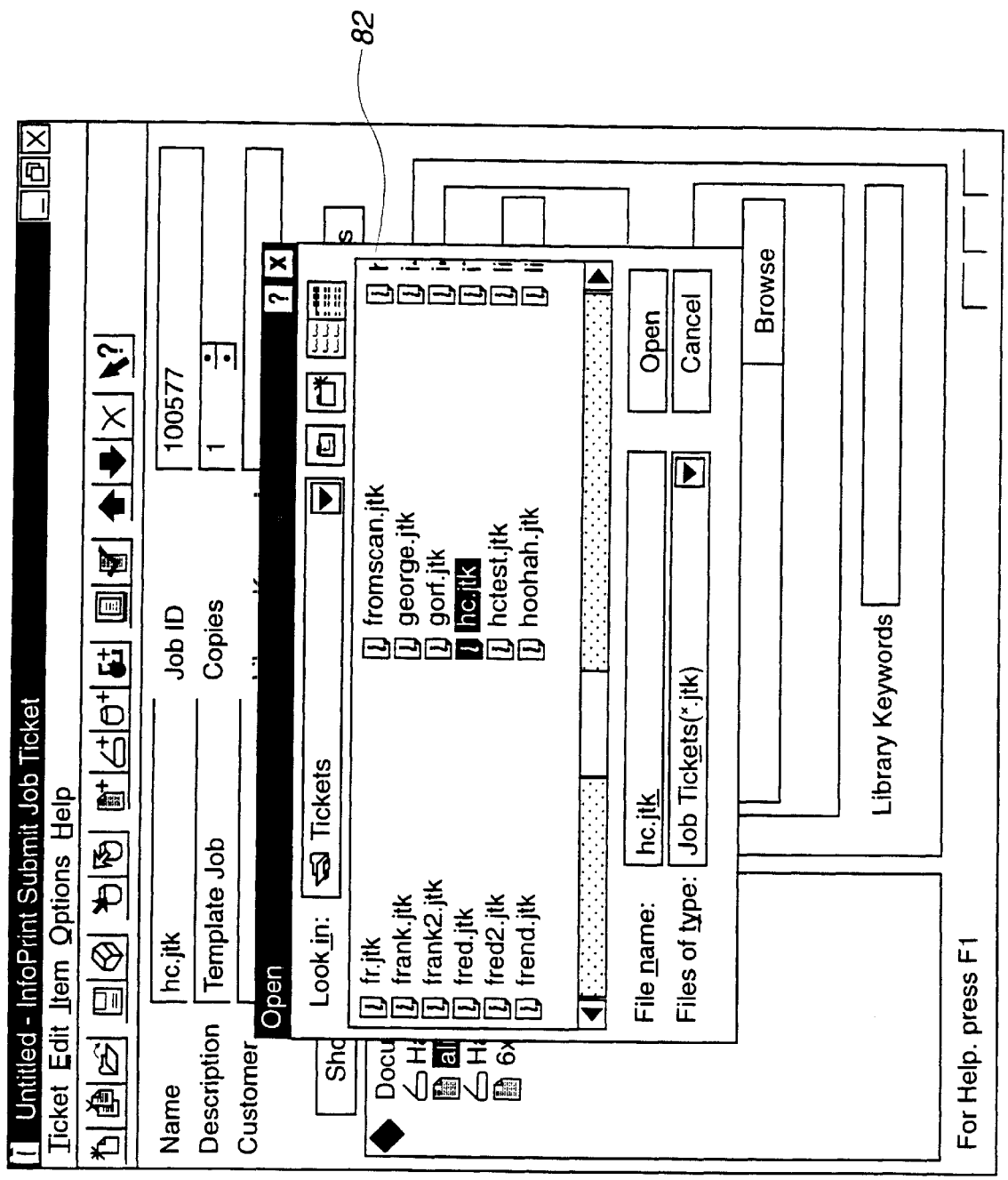

FIG. 9 shows an Open dialog box 82 that appears when the user selects the Open function from the Ticket submenu 80 (FIG. 8). The user may select and open one of the previously saved tickets displayed in the Open dialog box 82.

Figure 10:
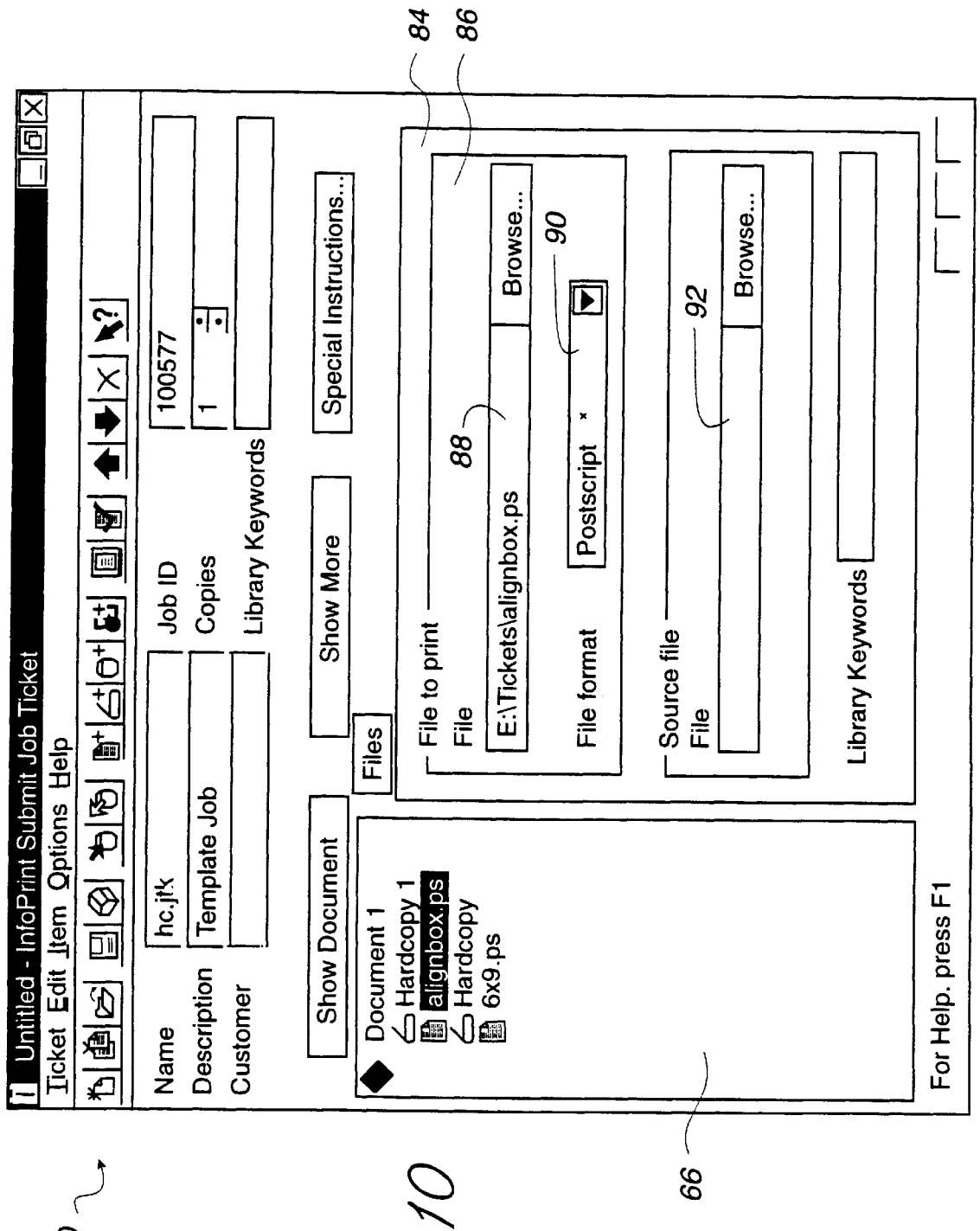

FIG. 10 shows the tree section 66 with two hardcopy items (Hardcopy 1 and Hardcopy 2) and two file items in PostScript format (alignbox.ps and 6x9.ps). The user may add, modify or delete elements from the tree section 66 using functions included in the Item and Edit main menu items. The Item submenu, shown in Table 1, includes functions which allow the user to add items, including files, hardcopies, library files, and variable data, and add documents. The user adds the hardcopy items using the Insert Hardcopy function and the PostScript file items using the Insert File function within the submenu of the Insert main menu item. The Edit submenu includes functions, shown in Table 1, which allow the user to modify the arrangement of the elements within the tree section 66, i.e., Move Up, Move Down, Remove, Delete.

FIG. 10 also shows a File attribute page 84 that appears when the user selects a particular file item with the mouse pointer. In FIG. 10, the user has selected the alignbox.ps file item. The file attribute page 84 allows the user to add information to the job ticket 40 on the location of the file item alignbox.ps and a source file from which the file item was generated. A file to print area 86 includes a File field 88 in which the user enters the location of the file item selected in the tree section 66, which in FIG. 8 is the directory path for the file "alignbox.ps." The user may enter the file location with a keyboard attached to the client computer 4a, b, c or the Browse radio button in the File to Print 84 area. The Browse radio button invokes a file manager GUI, such as is provided with the Microsoft Windows File Manager or Explorer programs. A file format field 90 indicates the format of the file item. This file format may be sniffed from the file name in the File field 88 or entered by the user. A source file field 92 provides the location of the original file from which the file item was generated. The user may enter the directory path for the source file in the source file field 84 using the keyboard or the Browse radio button.

Using the preferred embodiment of the present invention discussed above, the user may create a job ticket including documents and items, and set print attributes for the documents and items by selecting options in the print attribute pages 70a, b, c, d, e. As discussed, any setting at the document level within the tree section 66 applies to lower level items that branch from the document. There are primarily three ways to change the print attribute values available in the print attribute pages 70a, b, c, d, e. First, as discussed above, when a user selects a printer 28, 30, 31 or 32, the print attribute values reset to the values supported by the selected printer 28, 30, 31 or 32. Second, the InfoPrint Submit software 10 may occasionally query the InfoPrint MPC server 6 to obtain information on all the installed printers and printing options available. The InfoPrint Submit software would then modify the range of attribute values the user may select based on the information received from the InfoPrint MPC server 6 during the query. This process of querying the InfoPrint MPC server 6 to update printing options available on the client computer 4a, b, c is described in detail below. Still further, the InfoPrint Submit software includes the feature of allowing attribute fields to be added, deleted or modified in the print attribute pages 140. Third, the user may modify, delete, and add print attribute fields to the print attribute pages 70a, b, c, d, e.

In the preferred embodiment of the GUI 60 as set forth in Tables 1–9, the GUI 60 does not include a function to create the part record 48, 50 discussed above. Users can only create document records 44, 50 and item records 52, 54. However, in alternative embodiments, the job ticket 40 could include part elements. In such case, one of the submenus for the main menu items would include a function for adding parts records to the job ticket 40, such as the parts 48, 50 discussed above with respect to the job ticket 40 embodiment of FIG. 2. Alternatively, a submenu may include a function for grouping items into a named part. Associated with each part record 48, 50 would be print attribute pages 70a, b, c, d, e which would include fields for the user to enter print attribute information for the part records 48, 50. As discussed, any print attribute information entered for the part records would apply to any item records grouped in the part record.

Operational Flowcharts

Figure 11:
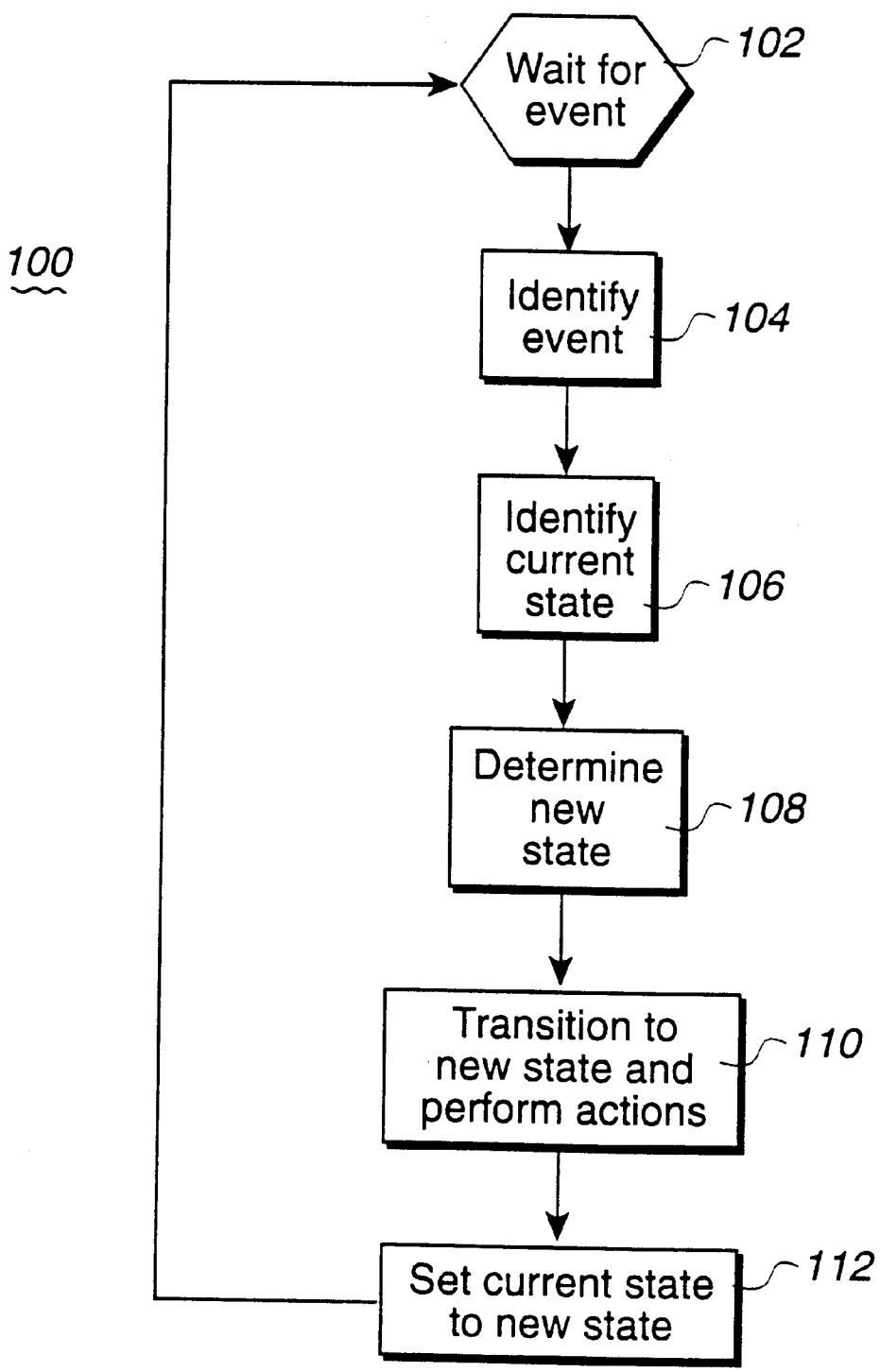
FIG. 11 is a flowchart that illustrates the general logic of a message or event-driven operating system and application program performing the steps of the present invention.

FIG. 11 is a flowchart that illustrates the general logic of the InfoPrint Submit software 10 according to the present invention. The InfoPrint Submit software 10 is event or message drive software, wherein operations are performed when transitions are made, based upon the receipt of messages or events, from present or current states to new states.

The general logic 100 begins by waiting at block 102 for an event (e.g., a mouse button click). It should be appreciated that during this time, other operating system tasks, e.g., file, memory, and video tasks, etc., may also be carried out. When an event occurs, control passes to block 104 to identify the event. Based upon the event, as well as the current state of the client computer 4a, b, c determined in block 106, a new state is determined in block 108. In block 110, the routine 60 transitions to the new state and performs any actions required for the transition. In block 112, the current state is set to the previously determined new state, and control returns to block 102 to wait for more input events.

The specific operations that are performed by block 100 when transitioning between states will vary depending upon the current state and the event. The various operations required to implement and maintain the present invention represent particular events handled by routine 100. However, it should be appreciated that these operations represent merely a subset of all of the events handled by any applications program or operating system.

Figure 12:
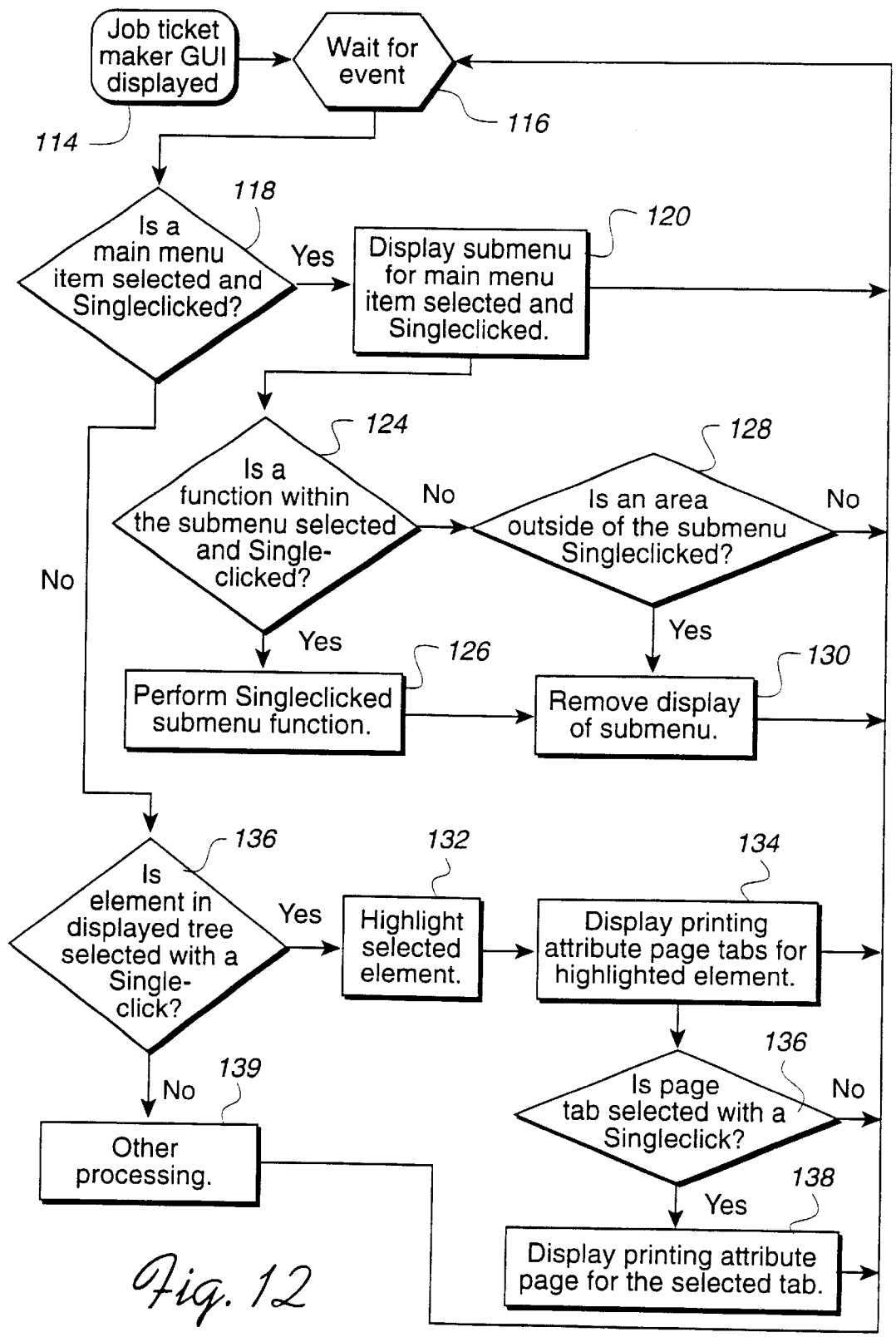
FIG. 12 is a flowchart that illustrates the general logic for a preferred embodiment of a routine performing the steps of the present invention.

FIG. 12 is a flowchart that illustrates more specific logic performed by the InfoPrint Submit software 10 when the GUI 60 is displayed as indicated at 114. The logic begins by waiting at block 116 for an event (e.g., a mouse button click signifying selection of a menu item). When an event occurs, control passes to blocks 118–139 to identify the events and perform associated functions.

Block 118 is a decision block that represents the client computer 4a, b, c determining whether a main menu item displayed on a main menu item bar 62 (FIG. 3) was selected and SingleClicked. If so, control transfers to Block 129; otherwise control transfers to block 122. Block 120 represents the client computer 4a, b, c displaying in the GUI 60 a submenu for the selected main menu item. From block 120, control transfers to block 124, which is a decision block that represents the client computer 4a, b, c determining whether a displayed function within the submenu was selected. If so, control transfers to block 126; otherwise control transfers to block 128. Block 126 represents the client computer 4a, b, c performing the selected submenu function. After performing the selected submenu function, control transfers to block 130, which represents the client computer 4a, b, c removing the display of the submenu. Block 128 is a decision block that represents the client computer 4a, b, c determining whether the user Single-Clicked on an area of the GUI 60 outside of the displayed submenu. If so, control transfers to block 130, which represents the client computer 4a, b, c removing the display of the submenu; otherwise control transfers back to block 116.

Block 122 is a decision block that represents the client computer 4a, b, c determining whether an element (document, part or item) displayed in a tree section 66 of the GUI 60 (FIG. 3) is selected with a SingleClick. If so, control transfers to block 132; otherwise control transfers to block 139. Block 132 represents the client computer 4a, b, c highlighting the selected element to indicate its selection. From block 132, control transfers to block 134, which represents the client computer 4a, b, c displaying print attribute page tabs 68a, b, c, d, e (FIG. 3) associated with the element highlighted at block 132. From block 134, control transfers to block 136, which is a decision block that represents the client computer 4a, b, c determining whether a print attribute page tab 68a, b, c, d, e was selected. If so, control transfers to block 138; otherwise control transfers back to block 116. Block 138 represents the client 4a, b, c displaying a print attribute page for the selected print attribute page tab 68a, b, c, d, e, which in the case of FIG. 3 is the Advanced print attribute page 70e. Block 139 represents the client computer 4a, b, c performing other processing.

The various functions associated with a SingleClick event are determined by the current state of the InfoPrint Submit software 10. In many instances, the current state is represented visually on the monitor connected to the client computer 4a, b, c.

It should be appreciated that there are a large number of states, events and operations that are associated with the InfoPrint Submit software 10. Generally, these various operations performed by the InfoPrint Submit software 10 can be classified within certain categories:

- while in any mode, selecting a main menu item from the main menu item bar 62 to display a submenu of functions;
- after selecting an element (document, part or item) within the tree section 66 of the GUI 60, selecting the Item or Edit main menu items to modify or edit the tree structure arrangement of elements;
- after selecting an element within the tree section of the GUI 60, selecting a print attribute page tab 68a, b, c, d, e for the selected element; or
- after selecting a print attribute page tab 70a, b, c, d, e, entering print attribute information on the displayed print attribute page 70a, b, c, d, e.

In preferred embodiments, the various operations described above are specifically related to the InfoPrint Submit software 10. Of course, those skilled in the art will recognize that the use of the present invention with computer programs may result in different operations (or potentially the same operations).

Also in the preferred embodiment, the identifier SingleClick is intended to indicate a default single click action, which uses the left mouse button. Other mouse buttons are indicated through the use of appended identifiers, such as (RightMouseButton), etc.

Of course, those skilled in the art will recognize that the use of any mouse button, keyboard sequence, voice command, or other user input is merely a design choice, and the functions performed by the present invention could be invoked by any number of different combinations of mouse buttons, keyboard sequences, voice command, or any other user input.

Customizing Print Attributes

Figure 13:
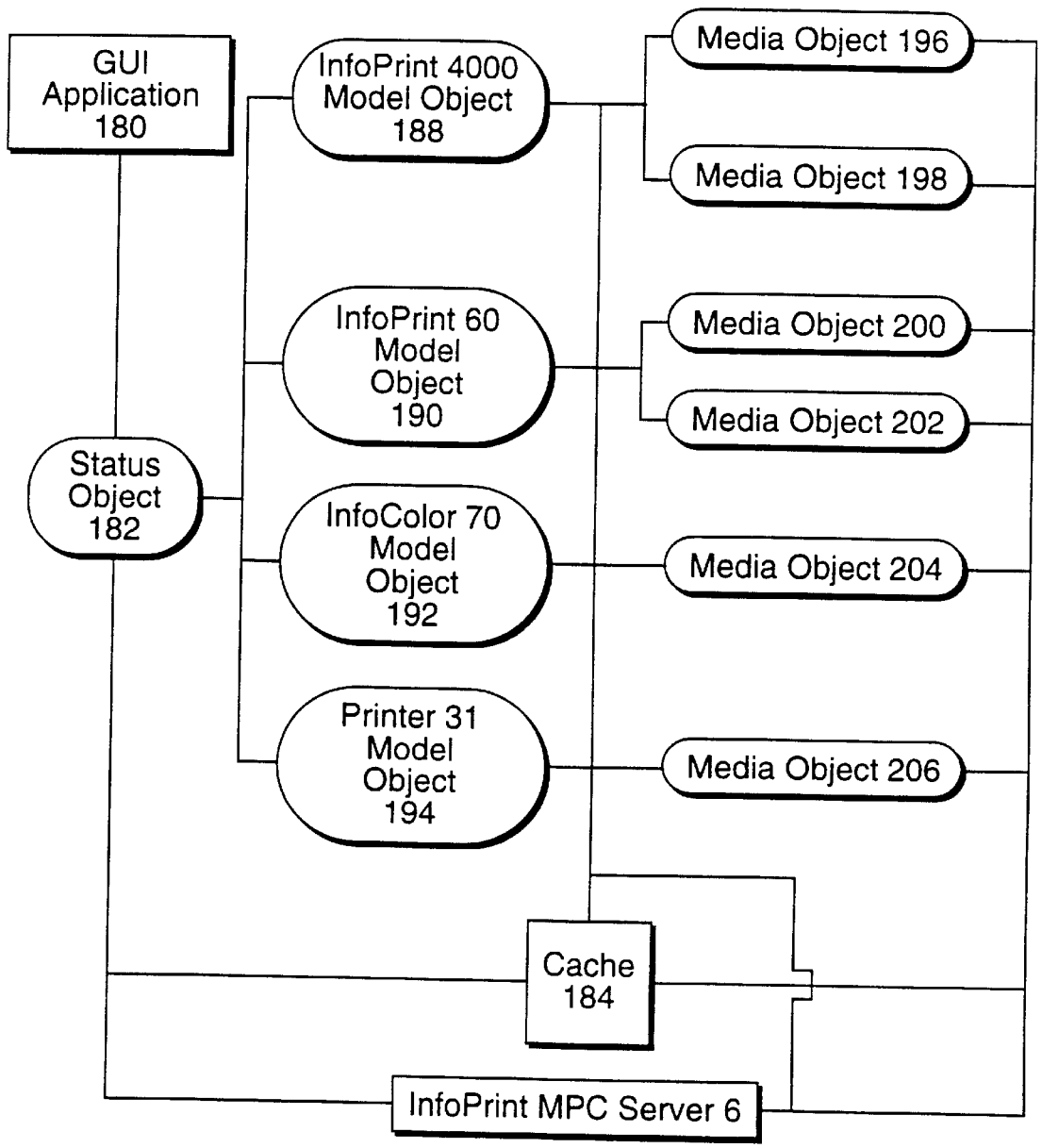
FIG. 13 is a block diagram illustrating a preferred embodiment of a program structure used to query print options available in the network printing system.

The present invention further includes a method, apparatus and article of manufacture for updating the print attribute values presented to the user in the print attribute pages 70a, b, c, d, e to insure that the print attributes the user selects are supported by the printers 28, 30, 31, 32 in the network printing system 2. FIG. 13 shows a preferred embodiment of the arrangement of program objects used to query the network printing system 2 to determine the available printer models, media, and printers.

With reference to FIG. 13, a GUI program 180, which in preferred embodiments is included in the InfoPrint Submit software 10, interfaces with other programs and objects to obtain information on the print attributes available in the network printing system 2. The GUI program 180 updates the GUI 60 with the obtained print attributes by generating data to the monitor 14a, b, c to cause the display of the available print attributes in the GUI 60. In the preferred embodiment of FIG. 13, the GUI program 180 queries a status object 182 for available printer models, the media available for a selected printer model, and the printers 28, 30, 31, 32 available in the network printing system 2 for a selected printer model and media. The status object 182, in turn, queries a cache 184 or the InfoPrint MPC server 6 to obtain information on the printer models available in the network printing system 2. The status object 182 then constructs a model object for each printer model type supported in the network printing system 2. In the preferred embodiment of FIG. 13, the status object 182 constructs an InfoPrint 4000 model object 188, an InfoPrint 60 model object 190, an InfoColor 70 model object 192, and a Printer model object 194. In alternative embodiments, different model objects would be created if different printer models are attached to the network printing system 2. However, only one object is created for a specific model, even if multiple printers of a particular printer model type are attached to the network printing system 2.

The model objects 188, 190, 192, 194 query the cache 184 or the InfoPrint MPC server 6 for information on the media available for the model. The model object creates a separate media object for each media type available for that model, e.g., paper size, color, paper quality, etc. In the preferred embodiment of FIG. 13, the InfoPrint 4000 model object 188 constructs two media objects 196, 198, the InfoPrint 60 model object 190 constructs two media objects 200, 202, the InfoColor 70 model object constructs one media object 204, and the printer 31 model object constructs one media object 206. If there are multiple printers of a certain model type attached to the network printing system 2 that support the same media type, then only one media object is created for that media type and printer model. In the network printing system 2 of the preferred embodiment shown in FIG. 1, the InfoPrint 60 printer 28 attached to the InfoPrint MPC server 6 may two paper trays, one for letter paper and the other for legal paper. In such case, the InfoPrint 60 model object 190 would construct media object 200 for the letter paper and media object 202 for the legal paper.

The media objects 196, 198, 200, 202, 204, 206 query the cache 184 or the InfoPrint MPC server 6 for printers available for a selected printer model and media. For instance, if media object 200 was constructed for the letter paper type, then media object 200 queries for all InfoPrint 60 printers in the network printing system 2 that have a paper tray supplying letter paper.

FIGS. 14a, b, c are flowcharts illustrating a preferred embodiment of how the GUI program 180 obtains information on the model, media and printers available in the network printing system 2. The logic illustrated in FIGS. 14a, b, c can be implemented in the InfoPrint Submit software 10 or some other software program installed in the client computer 4a, b, c. Such installed software would cause the client computer 4a, b, c to perform the steps illustrated in the flowcharts.

FIG. 14a is a flowchart illustrating how the GUI program 180 first obtains information on the printer models available in the network printing system 2. At step 210, the status object 182 waits for a query from the GUI program 180 for the printer models available in the network printing system 2. Upon receiving such a query, control transfers to block 212 which represents the status object 182 querying the cache 184 for the printer models available in the network printing system 2. Control then transfers to block 214 which is a decision block representing the client computer 4a, b, c determining whether the cache 184 includes information on the available printer models. If the cache 184 includes information on the available printer models, then control transfers to block 216; otherwise block 218. Block 218 represents the client computer 4a, b, c querying the InfoPrint MPC server 6 for the available printer models. Control transfers to block 220 which represents the client computer 4a, b, c updating the cache 184 with the available printer model information from the InfoPrint MPC server 6. From there, control transfers to block 216, which represents the client computer 4a, b, c passing the information on the available printer models to the status object 182.

From block 216, control transfers to block 220 which represents the status object 182 constructing model objects 188, 190, 192, 194 for each printer model available in the network printing system 2. Control then transfers to block 222 which represents the status object 182 providing the GUI program 180 with the list of available printer models. Control transfers to block 224 which represents the GUI program 180 updating the GUI 60 with the printer models currently available in the network printing system 2. From there control proceeds to block 226 in FIG. 14b.

Figure 14B:
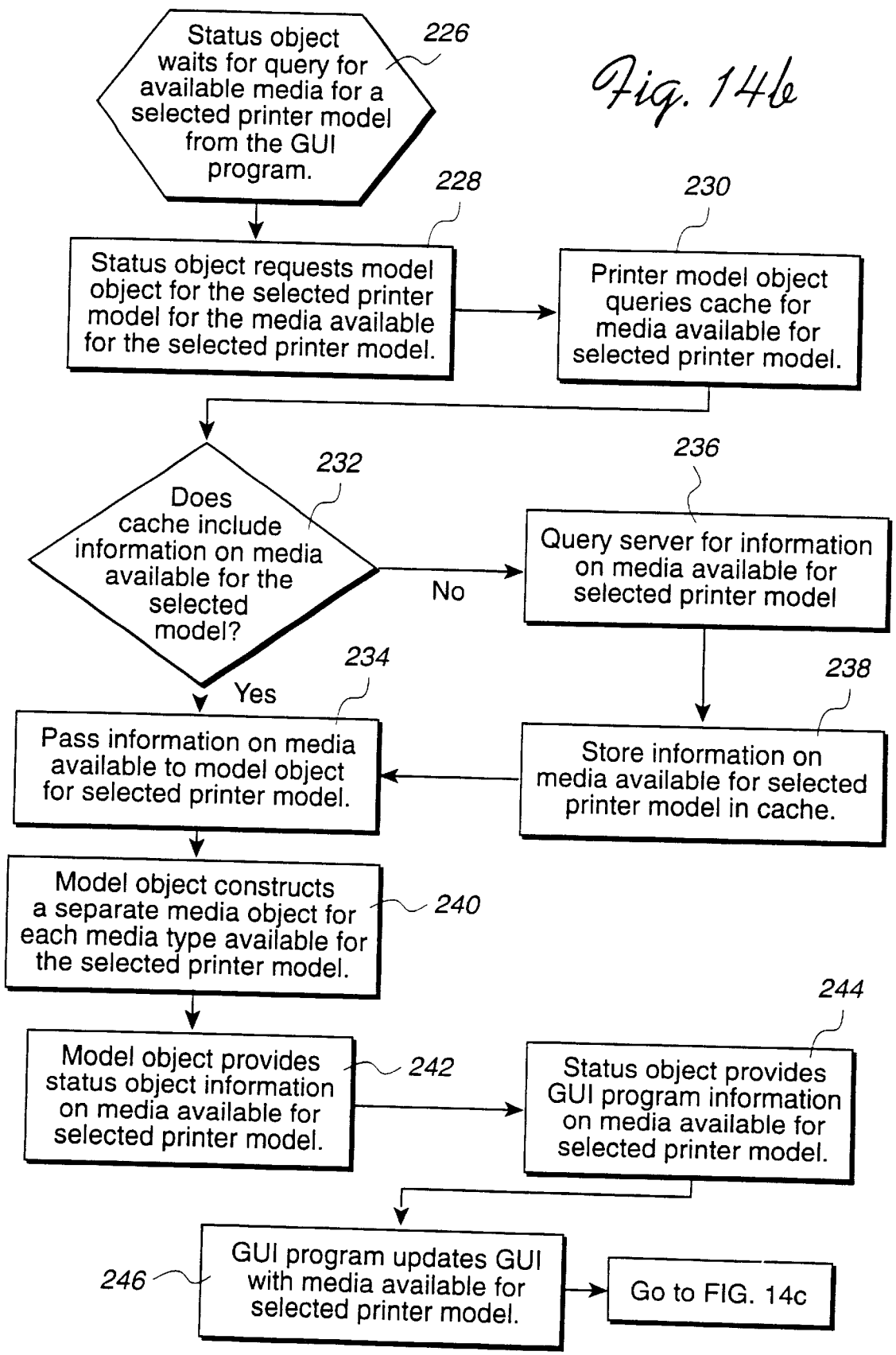

With reference to FIG. 14b, block 226 represents the status object 182 waiting for a request from the GUI program 180 for the media available for a selected printer model. The GUI program 180 would make such a query upon the user selecting a printer model from the GUI 60. After the GUI program 180 queries for the media available for a particular printer model, such as the InfoPrint 60, control transfers to block 228 which represents the status object 184 querying the model object (InfoPrint 60 model object 190) for the selected printer model for the available media. From there control proceeds to block 230, which represents the model object querying the cache 184 for the media available for the selected printer model.

Control then transfers to block 232 which is a decision block representing the client computer 4a, b, c determining whether the cache 184 includes information on the media available for the selected printer model (InfoPrint 60). If the cache 184 includes information on the available media, then control transfers to block 234; otherwise block 236. Block 236 represents the client computer 4a, b, c querying the InfoPrint MPC server 6 for the media available for the selected printer model, which in the case of the InfoPrint 60 model includes two media types, letter paper and legal paper. Control transfers to block 238 which represents the client computer 4a, b, c updating the cache 184 with the information from the InfoPrint MPC server 6 on the current media available for the selected printer model. From there, control transfers to block 234, which represents the client computer 4a, b, c passing the information on the media (letter and legal paper sizes) available for the selected printer model (InfoPrint 60) to the model object (InfoPrint 60 model object 190).

Control then transfers to block 240 which represents the model object (InfoPrint model object 60) constructing separate media objects (media objects 200, 202) for each media type available for the selected printer model. In the preferred embodiment of FIG. 13, media object 200 represents letter paper and media object 202 represents legal paper for the InfoPrint 60 printer model. Control then transfers to block 242 which represents the model object (InfoPrint 60 model object 60) passing the information on the available media to the status object 242, which then passes the information to the GUI program 180 at block 244. From there control transfers to block 246 which represents the GUI program 180 updating the GUI 60 with the current media available for the selected printer model. From there control transfers to block 248 in FIG. 14c.

Figure 14C:
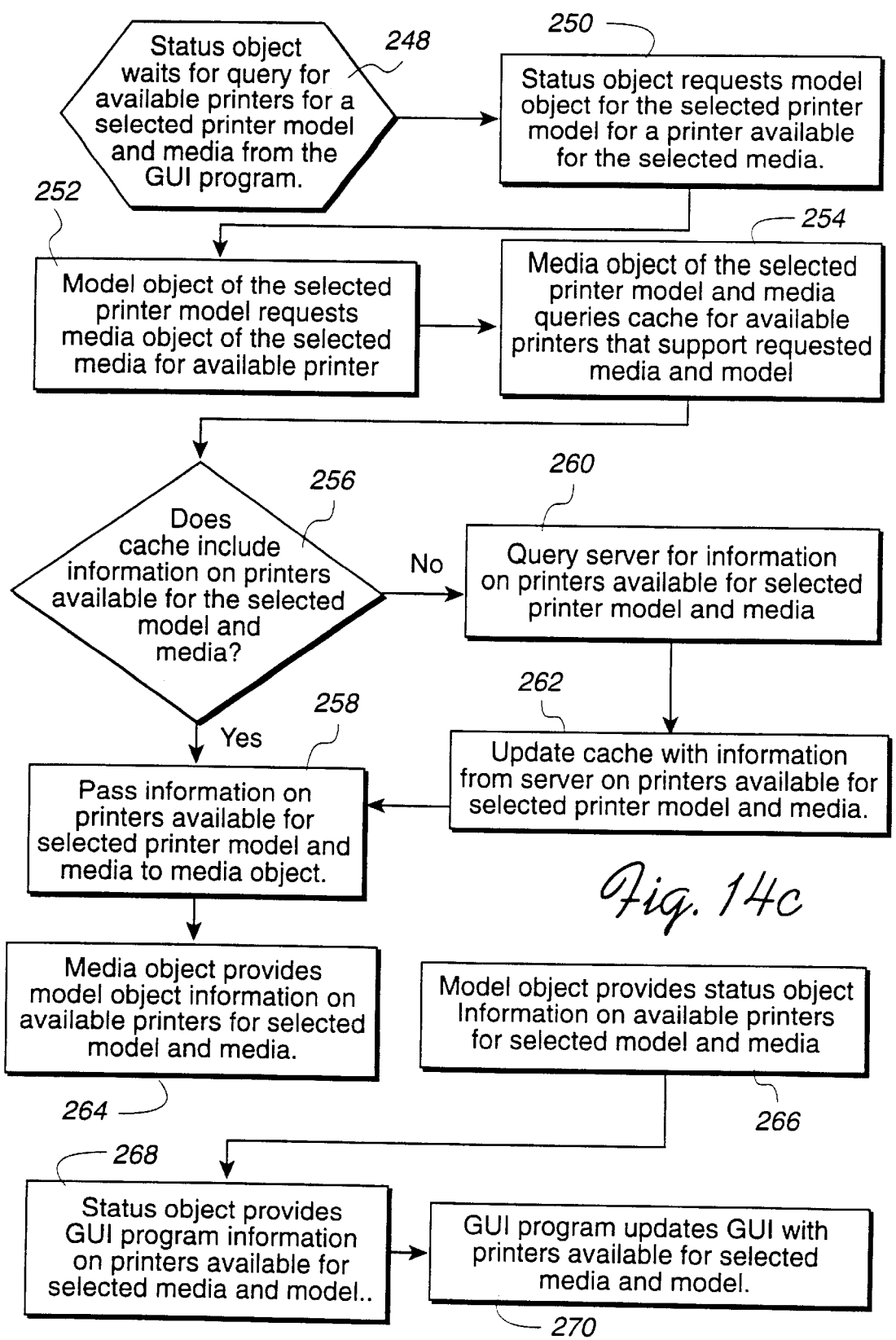

With reference to FIG. 14c, block 248 represents the status object 182 waiting for a query from the GUI program 180 for the printers available for a selected model and media. From block 248, control transfers to block 250 which represents the status object 184 querying the selected model object (InfoPrint 60 model object 190) for a printer available for the selected printer (InfoPrint 60) and media (letter paper). From there control transfers to block 252 which represents the model object (InfoPrint 60 model object 190) querying the media object (media object 200) for the available printers. From there control transfers to block 254 which represents the media object querying the cache 184 for the printers available for the selected model and media.

Control then transfers to block 256 which is a decision block representing the client computer 4a, b, c determining whether the cache 184 includes information on the printers available for the selected model (InfoPrint 60 28) and media (letter). If the cache 184 includes information on the available printers, then control transfers to block 258; otherwise block 260. Block 260 represents the client computer 4a, b, c querying the InfoPrint MPC server 6 for the printers available for the selected model and media. Control transfers to block 262 which represents the client computer 4a, b, c updating the cache 184 with information on the available printers. From there, control transfers to block 258, which represents the client computer 4a, b, c passing the information on the printers available for the selected printer model (InfoPrint 60) and media (letter paper) to the media object (media object 200).

Control then proceeds to block 264 which represents the media object (media object 200) providing the model object (InfoPrint model object 60) with the printers supporting the selected model and media. From there control transfers to block 266 which represents the model object (InfoPrint 60 model object 60) passing the information on the available printers to the status object 182, which then passes the information to the GUI program 180 at block 268. From there control proceeds to block 270 which represents the GUI program 180 updating the GUI 60 with the printers available for the selected printer model and media.

The logic of FIGS. 14a, b, c is described with respect to the network printing system 2 shown in FIG. 1. The objects created and information passed would differ if different printer models having different media were attached to the InfoPrint MPC server 6. Further, in the above example, FIGS. 14b and c were discussed with respect to selection of the InfoPrint 60. However, selection of a different printer model could alter the type and number of media objects generated, and the information on available printer models, media, and printers.

The GUI program 180 may query for information on the available media, model, and printers at different times. For instance, with reference to the preferred embodiment of FIGS. 5a, b, and Tables 1–9, the GUI program 180 would query and obtain information for available printer models in the manner discussed with respect to FIG. 14a when the user selects the Refresh Lists function from the Option submenu (Table 1). Upon receiving the printer model information, the GUI program 180 would update the printer models displayed in the drop down menu 76 (FIG. 5a) for the "Printer Type" field in the print attribute page 70b.

The GUI program 180 would query for available media as discussed with respect to FIG. 14b when a printer model is selected. A printer model is selected when the user selects a printer model from the drop down menu 76 or by default when the user opens up a new job ticket. For the other print options such as media and printer, a print option is selected by user selection or by default after the values for the print options are generated upon a query. Whenever values for a print option or any option are generated, a default value will be selected. In the preferred embodiment of FIGS. 5a, b, the default printer model is the "all black and white printers," which includes the InfoPrint 60 and InfoPrint 400 printer models. Upon receiving the requested media information, the GUI program 180 would update the media displayed in the drop down menu 78 (FIG. 5b) for the "Paper" field in the Print attribute page 70b. In the embodiment of FIG. 5b, the drop down menu 78 shows the media available for the selected default "Any black and white printer," including letter, legal, A3, A4, and B4 paper sizes.

The GUI program 180 would query for the printers available for a selected printer model and media in the manner described with respect to FIG. 14c when the user submits the job ticket for printing. Upon receiving information on the printers available for the selected printer model and media, the GUI program 180 would update the File page included in the submit dialog box as described in Table 8 with the available printers. When the user invokes the File page, a list of available printers will be displayed for the user to select. The print job described in the submitted job ticket will be sent to the selected printer for printing.

In an alternative embodiment, the GUI program 180 would query for the model, media, and printer when the user submits a job ticket for printing. When the user submits the job ticket, the GUI program 180 would query and obtain information on the available printer models as discussed with respect to FIG. 14a. The GUI program 180 would then cause the GUI 60 to display a dialog box to the user showing the available printer models to handle the print job. Upon the user selecting a particular printer model, the GUI program 180 would then query and obtain information on the media available for the selected printer as discussed with respect to FIG. 14b. The GUI program 180 would then cause the GUI 60 to display a dialog box to the user showing the media available for the selected printer model. Upon the user selecting a particular media, the GUI program 180 would then query and obtain information on the printers available for the selected model and media as discussed with respect to FIG. 14c. The GUI program 180 would then cause the GUI 60 to display a dialog box showing the user the printers available. Upon the user selecting an available printer from the GUI 60, the print job would be transmitted to the selected printer for printing.

Those skilled in the art will appreciate that the GUI program 180 could request model, media and printer information at times different than the times discussed with respect to the first and second embodiments discussed above. Still further, the order in which the GUI program 180 queries the status object 184 may differ. For instance, the GUI program 180 could skip the step of querying for media and just query for the printers available for a selected printer model. In yet further embodiments, additional queries could be conducted before the GUI program 180 queries for the available printers. In such case, a level of objects would be created to handle each additional query type.

The cache 184 may be periodically updated with information from the InfoPrint MPC server 6. Such updates may occur automatically whenever new printers or media are added or removed from the network printing system 2, or after a predetermined period of time has passed. In alternative embodiments, the cache 184 may be updated from the InfoPrint MPC server 6 upon user request. For instance, when the user selects the Refresh List function from the Options submenu (Table 1), the InfoPrint MPC server 6 is queried to update the cache 184. In yet further embodiments, the cache 184 could be updated after the user submits the print job. In this way, the user would not have to wait while the InfoPrint MPC server 6 is queried to update the cache 184. Moreover, the user may copy a file including the information from the cache 184 information to another system. In this way, the user can be at a remote location and use the cache 184 file when constructing a job ticket to satisfy any requests from the GUI program 180 for model, media and printer information.

In further embodiments, the object structure of the present invention could be used to update or create fields, options and values in the GUI 60 other than the printer model, media and printer options discussed above. For instance, upon the selection of a particular printer model, objects could be created for various options supported by the selected model. This information would then be passed to the GUI program 180 via the status object 182. The GUI program 180 would reconfigure the displayed GUI 60 to represent the options available for the selected model. If the user selects a particular option for the printer model, then the GUI application 180 would query the status object 182 for all particular sub-options and values available for the selected option. The status object 182 would then query the model object, which in turn would query the option model for all sub-options and values available for the selected printer model and option. The selected option object would pass information on sub-options and values for the selected option to the GUI program 180 via the model object and status object 182. The GUI program 180 would then update the GUI 60 with the available sub-options and values for the selected option.

The preferred embodiment updates options in the GUI 60 other than printer model, media, and printer using the present invention. For instance, the variable data item type is available for the InfoColor 70 and InfoPrint 4000 printer models, but not the InfoPrint 60 printer model. When the user selects the InfoPrint 60 printer model in the Printer Type field of the Print attribute page 70b (FIG. 5a), the GUI program 180 would query the status object 182 for unavailable options. The status object 182, in turn, would query the InfoPrint 60 model object 190, which, in turn, would query the cache 184 or InfoPrint MPC server 6 for unavailable options such as variable data. This information on the unavailability of variable data for the InfoPrint 60 model would be passed to the GUI program 180 via the InfoPrint 70 model object 190 and status object 182. The GUI program 180 would then update the GUI 60 to indicate the unavailability of the disabled options by graying out the "Insert Variable Data" option from the Item submenu (Table 1). In Table 5, the behavior column shows the print attribute options disabled upon the selection of a specific printer model in the Printer Type field in the Print attribute page 70b.

In preferred embodiments, the status, model, and media objects may be object oriented objects well known in the art, such as objects created using the C++, Smalltalk, and Java programming languages. Alternatively, other suitable programming objects known in the art may be used to implement the object structure discussed with respect to FIGS. 13, 14a, b, c. Moreover, the cache 184 and querying of the InfoPrint MPC server 6 may be comprised of multiple software objects.

The present invention minimizes delay time from querying for available model, media, and printers, and from querying the InfoPrint MPC server 6, while at the same time insuring that the user never submits a print job that cannot be handled by a printer in the network printing system 2. The GUI program 180 only queries for information when needed. For instance, media queries will not be conducted for printer models that will not be used because a media query is only conducted when a printer model is selected. Further, a query for available printers will only be conducted once because the printer query only takes place when the user submits the job ticket for printing. The present invention thus minimizes the number of queries to those absolutely necessary to insure that the user only selects printer model, media, and printers available in the network printing system.

Still further, the present invention minimizes delay time by querying the cache 184. Querying the cache 184 takes significantly less time than querying the InfoPrint MPC server 6. Thus, first checking the cache 184 for information minimizes the need to request information from the Info-Print MPC server 6, thereby further minimizing delays caused by server queries.

Still further the software structure of the preferred embodiment discussed with respect to FIGS. 13, 14a, b, c, minimizes the number of interfaces needed for the GUI program 180 to query and receive information. Regardless of the number of levels of objects created for different query types, the GUI program 180 only interfaces with the status object 182. Further, the status object 282 only interfaces with one group of objects, the model objects, regardless of the number of levels of objects created to provide information on available options and values. This hierarchical arrangement of objects insures that the interaction of objects at different levels of the hierarchy and between the objects and GUI program 180 does not expand or increase in complexity as levels of objects are added to the hierarchy.

Conclusion

This concludes the description of the preferred embodiments of the invention. The following describes some alternative embodiments for accomplishing the present invention.

For example, the client computer 4a, b, c and InfoPrint MPC server 6 may be any type of computer, such as a mainframe, minicomputer, work station, personal computer or combinations thereof operating under any suitable operating system. In addition, the client computer 4a, b, c may include any software program, application or operating system having a graphical user interface and performing the operations of the present invention. Still further, some or all of the functions described above as being performed by the client computer 4a, b, c could, in alternative embodiments, be performed by the InfoPrint MPC server 6, and vice versa.

Those skilled in the art will also recognize that the GUI and data structure may be modified to accommodate different types of print attributes other than those described above. Still further, the GUI may have a different appearance, layout and design then the GUI described above.

Still further, those skilled in the art will recognize that in the flowcharts set forth in FIGS. 11–13 and 14a, b, c, programming steps may be added, modified, deleted or performed in an order different than the order set forth in the preferred embodiments.

In summary, the present invention discloses a method, apparatus, and article of manufacture for selecting one of a plurality of printers attached to a server with a user interface program to print a print job. The user interface program is installed on a computer in communication with the server. First, the computer determines a first set of one or more print options, wherein each print option in the first set is supported by at least one of the printers. The user interface is then updated to include the first set of print options. After the user interface program is used to select a print option from the first set, the computer determines a second set of one or more print options available with the print option selected from the first set. Each print option in the second set is supported by at least one of the printers that also supports the print option selected from the first set. The user interface program is then updated to include the second set of print options. After the user interface program is used to select a print option from the second set, the computer determines all the printers that support the user selected print options. The user interface program is then updated with the printers that support the user selected print options. The user interface can then be used to select one of the printers that support the user selected print options to print the print job.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for selecting one of a plurality of printers in a network printing system with a user interface program, comprising:

querying a server to which the printers are attached to determine attributes of the first and second types and the printers that support the attributes;

updating a cache with the information queried from the server;

determining attributes of the first type by querying the cache to determine attributes of the first type and querying the server to determine attributes of the first type when the cache does not include information on attributes of the first type;

displaying information on the determined attributes of the first type in a computer user interface;

in response to selection of one of the displayed determined attributes of the first type, determining attributes of the second type by querying the cache to determine attributes of the second type and querying the server to determine attributes of the second type when the cache does not include information on attributes of the second type;

display information on the determined attributes of the second type in the computer user interface;

in response to selection of one of the displayed determined attributes of the first type and one of the determined attributes of the second type, determining all the printers that support the selected attributes of the first type and second type by querying the cache to determine all the printers that support the selected attributes of the first type and the second type and querying the server to determine all the printers that support the selected attributes when the cache does not include information on the printers that support the user selected print options; and displaying information on each determined printer that supports the selected attributes of the first and second type in the computer user interface.

2. The method of claim 1, wherein the first type of attributes comprises one or more types of printers attached to the server and the second type of attributes comprises one or more media types available for the selected type of printer.

3. The method of claim 1, wherein the step of updating the cache occurs when at least one of the following events occur: a user requests an update of the cache with the user interface; the print job has been submitted to the printer; a printer has been added to the server; a printer has been removed from the server; a printer has been modified; and a predetermined period of time has elapsed.

4. The method of claim 1, wherein determining the attributes of the first type is performed by a first program object, and further including:

generating a second program object for each determined attribute of the first type, wherein determining attributes of the second type is performed by the second program object generated for the print option the user selected from the first set; and generating a third program object for each determined attribute of the second type, wherein determining the printers that support the user selected attributes is performed by the third program object generated for the selected second type of attribute.

5. The method of claim 4, wherein the second program objects are generated by the first program object and wherein the third program objects are generated by the second program object generated for the selected second type of attribute.

6. The method of claim 4, wherein updating the computer user interface with the attributes of the second type further includes passing information on the attributes of the second type from the second program object to the first program object and from the first program object to the computer user interface; and wherein updating the computer user interface with the printers that support the selected attributes further includes passing the information on the printers that support the user selected attributes from the third program object to the second program object, from the second program object to the first program object, and from the first program object to the computer user interface.

7. A system for selecting one of a plurality of printers in a network printing system with a user interface program comprising:

a cache;

means for querying the server to determine attributes of the first and second types and the printers that support the attributes;

means for updating the cache with the information queried from the server;

means for determining attributes of the first type by querying the cache to determine attributes of the first type and querying the server to determine attributes of the first type when the cache does not include information on attributes of the first type;

means for displaying information on the determined attributes of the first type in a computer user interface;

means for determining attributes of the second type further by querying the cache to determine attributes of the second type and querying the server to determine attributes of the second type when the cache does not include information on attributes of the second type; and means for displaying information on the determined attributes of the second type in the computer user interface;

means for determining all the printers that support the selected attributes of the first type and second type by querying the cache to determine all the printers that support the selected attributes of the first type and the second type and querying the server to determine all the printers that support the selected attributes when the cache does not include information on the printers that support the user selected print options; and means for displaying information on each determined printer that supports the selected attributes of the first and second type computer user interface.

8. The network printing system of claim 7, wherein the first type of attributes comprises one or more types of printers attached to the server and the second type of attributes comprises one or more media types available for the selected type of printer.

9. The network printing system of claim 7, wherein the cache is updated when at least one of the following events occur: a user requests an update of the cache with the user interface; the print job has been submitted to the printer; a printer has been added to the server; a printer has been removed from the server; a printer has been modified; and a predetermined period of time has elapsed.

10. The network printing system of claim 7, wherein the means for determining the attributes of the first type is performed by a first program object, and further including:

means for generating a second program object for each determined attribute of the first type wherein determining attributes of the second type is performed by the second program object generated for the print option the user selected from the first set; and means for generating a third program object for each determined attribute of the second type, wherein determining the printers that support the user selected attributes is performed by the third program object generated for the selected second type of attribute.

11. The network printing system of claim 10, wherein the second program objects are generated by the first program object and wherein the third program objects are generated by the second program object generated for the selected second type of attribute.

12. The network printing system of claim 10, wherein the means for updating the computer user interface with the attributes of the second type further includes means for passing information on the attributes of the second type from the second program object to the first program object and from the first program object to the computer user interface; and wherein means for updating the computer user interface with the printers that support the selected attributes further includes means for passing the information on the printers that support the user selected attributes from the third program object to the second program object, from the second program object to the first program object, and from the first program object to the computer user interface.

13. An article of manufacture for use in selecting one of a plurality of printers in a network printing system with a user interface program, wherein the article of manufacture comprises a computer-readable storage medium having a computer program embedded therein that causes the computer to perform:

querying a server to which the printers are attached to determine attributes of the first and second types and the printers that support the attributes;

updating a cache with the information queried from the server;

determining attributes of the first type further by querying the cache to determine attributes of the first type and querying the server to determine attributes of the first type when the cache does not include information on attributes of the first type;

displaying information on the determined attributes of the first type in the computer user interface;

in response to selection of one of the displayed determined attributes of the first type, determining attributes of the second type by querying the cache to determine attributes of the second type and querying the server to determine attributes of the second type when the cache does not include information on attributes of the second type;

displaying information on the determined attributes of the second type in the computer user interface; and in response to selection of one of the displayed determined attributes of the first type and one of the determined attributes of the second type, determining all the printers that support the selected attributes of the first type and second type by querying the cache to determine all the printers that support the selected attributes of the first type and the second type and querying the server to determine all the printers that support the selected attributes when the cache does not include information on the printers that support the user selected print options.

14. The article of manufacture of claim 13, wherein the first type of attributes comprises one or more types of printers attached to the server and the second type of attributes comprises one or more media types available for the selected type of printer.

15. The article of manufacture of claim 13, wherein the step of updating the cache occurs when at least one of the following events occur: a user requests an update of the cache with the user interface; the print job has been submitted to the printer; a printer has been added to the server; a printer has been removed from the server; a printer has been modified; and a predetermined period of time has elapsed.

16. The article of manufacture of claim 13, wherein determining the attributes of the first type is performed by a first program object, and further including:

generating a second program object for each determined attribute of the first type, wherein determining attributes of the second type is performed by the second program object generated for the print option the user selected from the first set; and generating a third program object for each determined attribute of the second type, wherein determining the printers that support the user selected attributes is performed by the third program object generated for the selected second type of attribute.

17. The article of manufacture of claim 16, wherein the second program objects are generated by the first program object and wherein the third program objects are generated by the second program object generated for the selected second type of attribute.

18. The article of manufacture of claim 16, wherein updating the computer user interface with the attributes of the second type further includes passing information on the attributes of the second type from the second program object to the first program object and from the first program object to the computer user interface; and wherein updating the computer user interface with the printers that support the selected attributes further includes passing the information on the printers that support the user selected attributes from the third program object to the second program object, from the second program object to the first program object, and from the first program object to the computer user interface.

* * * * *